fibers to pure water to a solid concentration of 0.4% by mass, and stirring the mixture with a disperser under conditions of 1500 rpm and 5 minutes, is 20% or less.

United States Patent
Homma et al.

(10) Patent No.: US 11,053,325 B2
(45) Date of Patent: Jul. 6, 2021

(54) MATERIAL COMPRISING ULTRAFINE CELLULOSE FIBERS

(71) Applicant: OJI HOLDINGS CORPORATION, Tokyo (JP)

(72) Inventors: Ikue Homma, Tokyo (JP); Takayuki Shimaoka, Ibaraki (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 51 days.

(21) Appl. No.: 15/760,920

(22) PCT Filed: Sep. 16, 2016

(86) PCT No.: PCT/JP2016/077495
§ 371 (c)(1),
(2) Date: Mar. 16, 2018

(87) PCT Pub. No.: WO2017/047768
PCT Pub. Date: Mar. 23, 2017

(65) Prior Publication Data
US 2018/0265597 A1 Sep. 20, 2018

(30) Foreign Application Priority Data

Sep. 17, 2015 (JP) .............................. JP2015-183930
Sep. 17, 2015 (JP) .............................. JP2015-183931
Sep. 17, 2015 (JP) .............................. JP2015-183932
Sep. 17, 2015 (JP) .............................. JP2015-183933
Sep. 17, 2015 (JP) .............................. JP2015-183934

(51) Int. Cl.
| | |
|---|---|
| *D21H 11/18* | (2006.01) |
| *D21H 15/02* | (2006.01) |
| *C08B 15/04* | (2006.01) |
| *C08J 3/02* | (2006.01) |
| *C08L 1/02* | (2006.01) |
| *C08K 5/05* | (2006.01) |
| *C08J 3/09* | (2006.01) |
| *C08B 5/00* | (2006.01) |
| *C08L 1/16* | (2006.01) |
| *D21H 11/20* | (2006.01) |

(52) U.S. Cl.
CPC .............. *C08B 5/00* (2013.01); *C08B 15/04* (2013.01); *C08J 3/02* (2013.01); *C08J 3/095* (2013.01); *C08K 5/05* (2013.01); *C08L 1/02* (2013.01); *C08L 1/16* (2013.01); *D21H 11/18* (2013.01); *D21H 11/20* (2013.01); *D21H 15/02* (2013.01); *C08J 2301/16* (2013.01); *C08L 2201/56* (2013.01); *C08L 2205/16* (2013.01)

(58) Field of Classification Search
CPC ........ D21H 11/20; D21H 11/18; D21H 17/07; D21H 17/10; D21H 17/41; C08L 1/02; C08L 1/16; C08L 2205/16; C08L 2201/56; C08B 5/00; C08B 15/04; C09K 8/10; C08J 3/02; C08J 2301/16; C08J 2301/02; D01F 2/24; C08K 5/05; E21B 43/283; B82Y 40/00
See application file for complete search history.

(56) References Cited

U.S. PATENT DOCUMENTS

| | | | |
|---|---|---|---|
| 6,069,136 A | 5/2000 | Tahara et al. | |
| 9,309,385 B2 * | 4/2016 | Umemoto | ............. D21H 11/20 |
| 9,932,461 B2 * | 4/2018 | Banzashi | ................. C08J 3/02 |
| 10,273,633 B2 * | 4/2019 | Banzashi | ............. D21H 13/30 |
| 10,480,126 B2 * | 11/2019 | Hu | .......................... D21H 11/20 |
| 2009/0054552 A1 * | 2/2009 | Yano | ......................... C08J 5/06 |
| | | | 523/200 |
| 2011/0262731 A1 | 10/2011 | Mukai et al. | |
| 2012/0000392 A1 | 1/2012 | Mukai et al. | |
| 2013/0338250 A1 * | 12/2013 | Umemoto | ............. D21H 11/20 |
| | | | 522/18 |
| 2015/0011685 A1 * | 1/2015 | Mori | ........................ C08L 1/08 |
| | | | 524/35 |
| 2015/0079866 A1 | 3/2015 | Chao et al. | |
| 2015/0225550 A1 | 8/2015 | Banzashi et al. | |
| 2016/0010279 A1 * | 1/2016 | Hu | ...................... H01L 51/0097 |
| | | | 136/252 |
| 2016/0115249 A1 * | 4/2016 | Noguchi | .................. C08B 5/00 |
| | | | 536/62 |

(Continued)

FOREIGN PATENT DOCUMENTS

| | | | |
|---|---|---|---|
| CN | 101679682 A | 3/2010 | |
| CN | 104704169 A | 6/2015 | |

(Continued)

OTHER PUBLICATIONS

Machine Translation of JP 2014084431 A (Year: 2014).*
Machine Translation of JP 2014125690 A (Year: 2014).*
International Search Report with Written Opinion dated Dec. 20, 2016, issued by the International Searching Authority in application No. PCT/JP2016/077495.

(Continued)

*Primary Examiner* — Jose A Fortuna
(74) *Attorney, Agent, or Firm* — Sughrue Mion, PLLC

(57) ABSTRACT

An object of the invention is to provide a material comprising ultrafine cellulose fibers, having good dispersibility of fine particles in an aqueous medium containing ultrafine cellulose fibers. According to the invention, there is provided a material comprising ultrafine cellulose fibers, wherein the content of the ultrafine cellulose fibers is 80% by mass or more, and the haze value of a sample, which has been prepared by adding the material comprising ultrafine cellulose fibers to pure water to a solid concentration of 0.4% by mass, and stirring the mixture with a disperser under conditions of 1500 rpm and 5 minutes, is 20% or less.

11 Claims, 1 Drawing Sheet

(56) References Cited

U.S. PATENT DOCUMENTS

| | | | |
|---|---|---|---|
| 2017/0183820 A1* | 6/2017 | Banzashi | D21H 13/30 |
| 2017/0226398 A1* | 8/2017 | Shimaoka | C09K 8/10 |
| 2017/0226399 A1* | 8/2017 | Shimaoka | C09K 8/10 |
| 2017/0226407 A1* | 8/2017 | Homma | C09K 8/10 |
| 2018/0010299 A1* | 1/2018 | Hu | H01L 51/0093 |
| 2018/0223080 A1* | 8/2018 | Banzashi | C08L 1/02 |
| 2018/0265597 A1* | 9/2018 | Homma | C08L 1/16 |
| 2018/0296446 A1* | 10/2018 | Homma | A61K 8/73 |
| 2019/0055697 A1* | 2/2019 | Sakai | C08L 1/00 |
| 2019/0085511 A1* | 3/2019 | Shimaoka | D21H 17/675 |
| 2019/0127915 A1* | 5/2019 | Noguchi | D21H 11/04 |
| 2019/0177916 A1* | 6/2019 | Mizukami | C08J 3/02 |
| 2019/0292728 A1* | 9/2019 | Hu | H01L 31/048 |
| 2020/0002883 A1* | 1/2020 | Zhao | C08B 15/05 |
| 2020/0032455 A1* | 1/2020 | Zhao | B32B 29/005 |
| 2020/0131279 A1* | 4/2020 | Fushimi | D21H 11/18 |

FOREIGN PATENT DOCUMENTS

| | | | | |
|---|---|---|---|---|
| EP | 2 371 893 A1 | 10/2011 | | |
| EP | 2 679 604 A1 | 1/2014 | | |
| EP | 2 799 491 A1 | 11/2014 | | |
| EP | 2 884 000 A1 | 6/2015 | | |
| EP | 3351562 A1 * | 7/2018 | | D21H 11/20 |
| EP | 3385443 A1 * | 10/2018 | | D21H 19/20 |
| EP | 3409834 A1 * | 12/2018 | | D21H 11/18 |
| JP | 9-316102 A | 12/1997 | | |
| JP | 2009-203559 A | 9/2009 | | |
| JP | 2010-168573 A | 8/2010 | | |
| JP | 2011-006551 A | 1/2011 | | |
| JP | 2013-104133 A | 5/2013 | | |
| JP | 2013-163773 A | 8/2013 | | |
| JP | 2014-508228 A | 4/2014 | | |
| JP | 2014-084431 A | 5/2014 | | |
| JP | 2014-125690 A | 7/2014 | | |
| JP | 2014227525 A * | 12/2014 | | |
| JP | 2014234457 A * | 12/2014 | | |
| JP | 2015-108094 A | 6/2015 | | |
| JP | 2015-134873 A | 7/2015 | | |
| JP | 2017057292 A * | 3/2017 | | D21H 11/04 |
| WO | 2010/073678 A1 | 7/2010 | | |
| WO | 2010/074341 A1 | 7/2010 | | |
| WO | 2010/089948 A1 | 8/2010 | | |
| WO | 2011/070923 A1 | 6/2011 | | |
| WO | 2012/107642 A1 | 8/2012 | | |
| WO | 2012115115 A1 | 8/2012 | | |
| WO | 2013099770 A1 | 7/2013 | | |
| WO | 2013/176033 A1 | 11/2013 | | |
| WO | 2014/024876 A1 | 2/2014 | | |
| WO | 2014/185505 A1 | 11/2014 | | |
| WO | WO-2016002688 A1 * | 1/2016 | | C09K 8/10 |
| WO | WO-2016002689 A1 * | 1/2016 | | C09K 8/035 |
| WO | WO-2016060120 A1 * | 4/2016 | | C09K 8/10 |
| WO | WO-2017141800 A1 * | 8/2017 | | C08K 5/00 |
| WO | WO-2017170908 A1 * | 10/2017 | | D21H 11/04 |

OTHER PUBLICATIONS

International Preliminary Report on Patentability with Written Opinion dated Mar. 29, 2018, issued by the International Searching Authority in application No. PCT/JP2016/077495.
Office Action dated Dec. 15, 2015 from the Japanese Patent Office in counterpart Japanese Application No. 2015-183934.
Office Action dated Sep. 12, 2017 from the Japanese Patent Office in counterpart Japanese Application No. 2016-181456.
Office Action dated Feb. 20, 2018 from the Japanese Patent Office in counterpart Japanese Application No. 2016-181456.
Office Action dated Sep. 12, 2017 from the Japanese Patent Office in counterpart Japanese Application No. 2016-181457.
Office Action dated Feb. 20, 2018 from the Japanese Patent Office in counterpart Japanese Application No. 2016-181457.
Office Action dated Mar. 16, 2019 from Korean Patent Office in counterpart KR Application No. 10-2018-7010147.
Extended European Search Report dated Jun. 13, 2019, issued by the European Patent Office in corresponding European Application No. 16846639.9.
Office Action dated Feb. 12, 2019, from the Japanese Patent Office in counterpart Japanese application No. 2015-183933.
Office Action dated Dec. 17, 2019, issued by the State Intellectual Property Office of the P.R.C. in Chinese application No. 201680054151.2.
Office Action dated Jan. 3, 2020, issued by the Korean Intellectual Property Office in Korean application No. 10-2018-7010147.
Communication dated Jun. 30, 2020 by the Japanese Patent Office in application No. 2016-181458.
Communication dated Jul. 25, 2020 by the Korean Patent Office in Application No. 10-2020-7012127.
Communication dated Jun. 30, 2020 by the China National Intellectual Property Administration in application No. 201680054151.2.
Office Action dated Dec. 5, 2020 by the Korean Patent Office in Korean Application No. 10-2020-7012127.
Office Action dated Jan. 20, 2021 by the Korean Patent Office in Korean Application No. 10-2020-7012127.

* cited by examiner

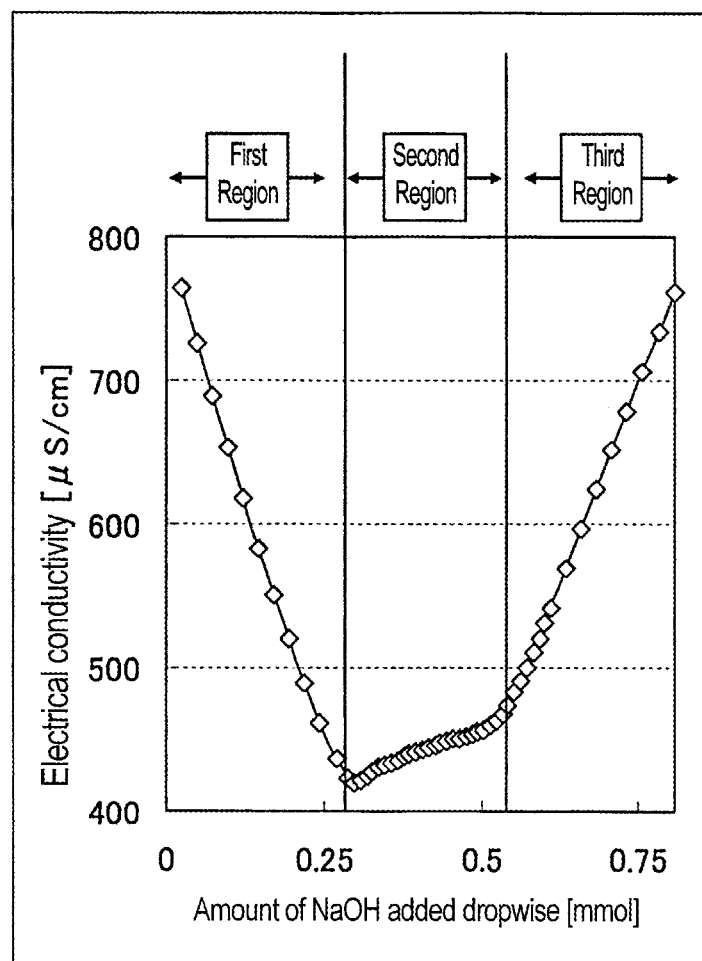

MATERIAL COMPRISING ULTRAFINE CELLULOSE FIBERS

CROSS REFERENCE TO RELATED APPLICATIONS

This application is a National Stage of International Application No. PCT/JP2016/077495 filed Sep. 16, 2016, claiming priority based on Japanese Patent Application No. 2015-183930 filed Sep. 17, 2015, Japanese Patent Application No. 2015-183931 filed Sep. 17, 2015, Japanese Patent Application No. 2015-183932 filed Sep. 17, 2015, Japanese Patent Application No. 2015-183933 filed Sep. 17, 2015, and Japanese Patent Application No. 2015-183934 filed Sep. 17, 2015, all of which are incorporated by reference.

TECHNICAL FIELD

The present invention relates to a material comprising ultrafine cellulose fibers having excellent dispersibility of fine particles.

BACKGROUND ART

In recent years, for the sake of substitution for petroleum resources and from growing awareness of the environment, materials utilizing renewable natural fibers have been drawing attention. Among natural fibers, cellulose fibers having a fiber diameter of 10 to 50 μm, especially cellulose fibers (pulp) originated from wood have been heretofore widely used mainly as a paper product. As cellulose fibers, ultrafine cellulose fibers having a fiber diameter of 1 μm or less are also known.

An aqueous suspension or dispersion of cellulose fibers usually contains several to several hundreds of times as much solvent with respect to the cellulose fibers. Handling of such an aqueous suspension or dispersion as it is is troublesome, because the storage space increases, and the storage and transportation costs increase. Therefore, it has been attempted to prepare a cellulose concentrate.

For example, Patent Document 1 (JP-A-2014-508228) describes a method for treating an aqueous gel of cellulose nanofibrils, by which water is removed from an aqueous gel using an organic solvent miscible with water. In this method, an aqueous gel is introduced into the organic solvent in a controlled manner, so that the aqueous gel is maintained as a separate phase and a physical entity containing cellulose nanofibrils is formed in the separate phase, and water is exchanged with the organic solvent to separate the physical entity from the organic solvent. Patent Document 2 (JP-A-9-316102 (1997)) describes a bacterial cellulose concentrate containing unmacerated bacterial cellulose at a content of not less than 10% by weight and less than 75% by weight. Patent Document 3 (JP-A-2010-168573) describes a cellulose fiber suspension containing cellulose fibers, a polyvalent metal, and a volatile base, wherein the average fiber diameter of the cellulose fibers is 200 nm or less, and the content of a carboxyl group in the cellulose is 0.1 to 2 mmol/g. Patent Document 4 (JP-A-2015-134873) describes a method for producing a dry solid of anion-modified cellulose nanofibers, in which, after adjusting the pH of an aqueous suspension of anion-modified cellulose nanofibers to 9 to 11, and dehydration and drying are performed.

PRIOR ART DOCUMENTS

Patent Documents

Patent Document 1: JP-A-2014-508228
Patent Document 2: JP-A-9-316102 (1997)
Patent Document 3: JP-A-2010-168573
Patent Document 4: JP-A-2015-134873

SUMMARY OF INVENTION

Object to be Solved by the Invention

As described above, Patent Document 1 to 4 (JP-A-2014-508228, JP-A-9-316102 (1997), JP-A-2010-168573, and JP-A-2015-134873) describe preparation of a cellulose concentrate. However, the inventors have paid attention, particularly when a concentrate of ultrafine cellulose fibers is used as a thickener, to a risk of deterioration of dispersibility of fine particles (such as titanium oxide) in an aqueous medium containing the ultrafine cellulose fibers. Further, in order to obtain sufficient dispersibility of fine particles, it was necessary in some cases to stir for a long time after adding a thickener to an aqueous medium. Study from the above viewpoints with respect to a concentrate of ultrafine cellulose fibers has not been sufficiently carried out so far.

The present invention has been made in view of the above problems. An object of the present invention is to provide a material comprising ultrafine cellulose fibers having good dispersibility of fine particles in an aqueous medium containing ultrafine cellulose fibers. Another object of the present invention is to provide a material comprising ultrafine cellulose fibers having good dispersibility of fine particles in an aqueous medium obtained by stirring the medium for a short time after adding ultrafine cellulose fibers.

Means for Solving the Object

The present inventors have extensively studied in order to attain the above-mentioned objects. As a result, it has been found that the dispersibility of fine particles in an aqueous medium containing ultrafine cellulose fibers can be improved by controlling the haze value of a sample, which has been prepared under predetermined conditions using a highly concentrated concentrate of ultrafine cellulose fibers, at a certain value or less. Further, the inventors have found that the above haze value can be controlled by adjusting appropriately a method for concentrating a material comprising ultrafine cellulose fibers, the amount of a substituent on ultrafine cellulose fibers, and the like respectively. The present invention has been completed based on these findings.

That is, the present invention provides the following inventions.

(A-1) A material comprising ultrafine cellulose fibers, wherein the content of the ultrafine cellulose fibers is 80% by mass or more, and the haze value of the following sample is 20% or less, where the sample has been prepared by adding the material comprising ultrafine cellulose fibers to pure water to a solid concentration of 0.4% by mass, and stirring the mixture with a disperser under conditions of 1500 rpm and 5 minutes.

(A-2) The material comprising ultrafine cellulose fibers according to (A-1), further comprising an organic solvent.

(A-3) The material comprising ultrafine cellulose fibers according to (A-2), wherein the organic solvent is isopropyl alcohol.

(A-4) The material comprising ultrafine cellulose fibers according to (A-2) or (A-3), further comprising water.

(A-5) The material comprising ultrafine cellulose fibers according to any one of (A-1) to (A-4), further comprising a polyvalent metal.

(A-6) The material comprising ultrafine cellulose fibers according to any one of (A-1) to (A-5), further comprising an acid at 0.14% by mass or less with respect to the mass of the ultrafine cellulose fibers.

(A-7) The material comprising ultrafine cellulose fibers according to any one of (A-1) to (A-6), further comprising an alkali at 2% by mass or less with respect to the mass of the ultrafine cellulose fibers.

(A-8) The material comprising ultrafine cellulose fibers according to any one of (A-1) to (A-7), wherein the ultrafine cellulose fibers have an ionic substituent.

(A-9) The material comprising ultrafine cellulose fibers according to any one of (A-1) to (A-8), wherein the ultrafine cellulose fibers have a phosphoric acid group.

(A-10) The material comprising ultrafine cellulose fibers according to any one of (A-1) to (A-9), wherein the amount of the phosphoric acid group in the ultrafine cellulose fibers is 0.5 mmol/g or more.

(A-11) The material comprising ultrafine cellulose fibers according to any one of (A-1) to (A-10), wherein the content of the ultrafine cellulose fibers is 95% by mass or less.

(A-12) The material comprising ultrafine cellulose fibers according to any one of (A-1) to (A-11), wherein the pH of the following sample is 7 to 11 where the sample has been prepared by adding the material comprising ultrafine cellulose fibers to pure water to a solid concentration of 0.4% by mass, and stirring the mixture with a disperser under conditions of 1500 rpm and 5 minutes.

(A-13) The material comprising ultrafine cellulose fibers according to any one of (A-1) to (A-12), which is in a particulate form.

As a result of further studies, the inventors have found that the dispersibility of fine particles in an aqueous medium containing the ultrafine cellulose fibers can be improved by controlling each of the viscosity and the haze value of a sample prepared under predetermined conditions using a material comprising ultrafine cellulose fibers within a certain range. Further, the inventors have found that the viscosity and the haze value can be regulated by adjusting appropriately each of a method for concentrating a material comprising ultrafine cellulose fibers, the amount of a substituent on ultrafine cellulose fibers, and the like. The present invention has been completed based on these findings.

That is, the present invention provides the following inventions.

(B-1) A material comprising ultrafine cellulose fibers, wherein the content of the ultrafine cellulose fibers is 5% by mass or more, and the following sample satisfies the following condition A and condition B:
Condition A: the viscosity measured at 3 rpm and 25° C. with a B type viscometer is 2800 mPa·s or more, and
Condition B: the haze value is 10% or more and 50% or less.
where the sample has been prepared by adding the material comprising ultrafine cellulose fibers to pure water to a solid concentration of 0.4% by mass, and stirring the mixture with a disperser at 1500 rpm for 5 minutes.

(B-2) The material comprising ultrafine cellulose fibers according to (B-1), further comprising an organic solvent.

(B-3) The material comprising ultrafine cellulose fibers according to (B-2), wherein the organic solvent is isopropyl alcohol.

(B-4) The material comprising ultrafine cellulose fibers according to (B-2) or (B-3), further comprising water.

(B-5) The material comprising ultrafine cellulose fibers according to any one of (B-1) to (B-4), wherein the ultrafine cellulose fibers have an ionic substituent.

(B-6) The material comprising ultrafine cellulose fibers according to any one of (B-1) to (B-5), wherein the ultrafine cellulose fibers have a phosphoric acid group.

(B-7) The material comprising ultrafine cellulose fibers according to any one of (B-1) to (B-6), wherein the amount of a phosphoric acid group on the ultrafine cellulose fibers is 0.5 mmol/g or more.

(B-8) The material comprising ultrafine cellulose fibers according to any one of (B-1) to (B-7), wherein the content of the ultrafine cellulose fibers is 95% by mass or less.

(B-9) The material comprising ultrafine cellulose fibers according to any one of (B-1) to (B-8), further comprising coarse cellulose fibers having an average fiber width of more than 1 μm.

(B-10) The material comprising ultrafine cellulose fibers according to (B-9), wherein the coarse cellulose fibers have a fiber length of 10 μm or more.

(B-11) The material comprising ultrafine cellulose fibers according to any one of (B-1) to (B-10) which is in a particulate form.

As a result of further investigations by the inventors, it has been found that excellent dispersibility of fine particle can be achieved in an aqueous medium prepared by adding ultrafine cellulose fibers and thereafter stirring the medium for a short time (e.g. less than 3 minutes), by means of adjustment of a cumulative median diameter D50 of a material comprising ultrafine cellulose fibers in a particulate form below a predetermined value. The present invention has been completed based on these findings.

That is, the present invention provides the following inventions.

(C-1) A material comprising ultrafine cellulose fibers, which has a content of the ultrafine cellulose fibers of 5% by mass or more, is in a particulate form, and has a cumulative median diameter D50 of 1.2 mm or less.

(C-2) The material comprising ultrafine cellulose fibers according to (C-1), wherein the haze value of the following sample is 20% or less where the sample has been prepared by adding the material comprising ultrafine cellulose fibers to pure water to a solid concentration of 0.4% by mass, and stirring the mixture with a disperser under conditions of 1500 rpm and 5 minutes.

(C-3) The material comprising ultrafine cellulose fibers according to (C-1) or (C-2), wherein the specific surface area is 0.005 $m^2/cm^3$ or more and 0.5 $m^2/cm^3$ or less.

(C-4) The material comprising ultrafine cellulose fibers according to any one of (C-1) to (C-3), wherein the angle of repose is 4 to 50°.

(C-5) The material comprising ultrafine cellulose fibers according to any one of (C-1) to (C-4), wherein the bulk density is 0.1 to 0.5 g/mL.

(C-6) The material comprising ultrafine cellulose fibers according to any one of (C-1) to (C-5), wherein the cumulative median diameter D50 is 50 μm or more.

(C-7) The material comprising ultrafine cellulose fibers according to any one of (C-1) to (C-6)), further comprising an organic solvent.

(C-8) The material comprising ultrafine cellulose fibers according to (C-7), wherein the organic solvent is isopropyl alcohol.

(C-9) The material comprising ultrafine cellulose fibers according to any one of (C-1) to (C-8), further comprising water.

(C-10) The material comprising ultrafine cellulose fibers according to any one of (C-1) to (C-9), wherein the ultrafine cellulose fibers have an ionic substituent.
(C-11) The material comprising ultrafine cellulose fibers according to any one of (C-1) to (C-10), wherein the ultrafine cellulose fibers have a phosphoric acid group.
(C-12) The material comprising ultrafine cellulose fibers according to any one of (C-1) to (C-11), wherein the amount of a phosphoric acid group in the ultrafine cellulose fibers is 0.5 mmol/g or more.

As a result of further investigations by the inventors, it has been found that the dispersibility of fine particles in an aqueous medium containing ultrafine cellulose fibers can be improved by controlling the content of a non-dispersive component in a material comprising ultrafine cellulose fibers to a certain value or less. The present invention has been completed based on these findings.

That is, the present invention provides the following inventions.

(D-1) A material comprising ultrafine cellulose fibers, wherein the content of the ultrafine cellulose fibers is 5% by mass or more, and the content of a non-dispersive component defined below is 20% or less:

Content of non-dispersive component (%)=100−(C/0.2)×100 wherein C is a solid concentration of a supernatant liquid obtained by centrifuging an aqueous dispersion comprising the material comprising ultrafine cellulose fibers at a solid concentration of 0.2% by mass in a high-speed refrigerated centrifuge under conditions of 12000 G and 10 minutes.
(D-2) The material comprising ultrafine cellulose fibers according to (D-1), further comprising an organic solvent.
(D-3) The material comprising ultrafine cellulose fibers according to (D-2), wherein the organic solvent is isopropyl alcohol.
(D-4) The material comprising ultrafine cellulose fibers according to (D-2) or (D-3), further comprising water.
(D-5) The material comprising ultrafine cellulose fibers according to any one of (D-1) to (D-4), wherein the ultrafine cellulose fibers have an ionic substituent.
(D-6) The material comprising ultrafine cellulose fibers according to any one of (D-1) to (D-5), wherein the ultrafine cellulose fibers have a phosphoric acid group.
(D-7) The material comprising ultrafine cellulose fibers according to any one of (D-1) to (D-6), wherein the amount of a phosphoric acid group in the ultrafine cellulose fibers is 0.5 mmol/g or more.
(D-8) The material comprising ultrafine cellulose fibers according to any one of (D-1) to (D-7) which is in a particulate form.

As a result of further investigations by the inventors, it has been found that the dispersibility of fine particles in an aqueous medium containing ultrafine cellulose fibers can be improved by regulating the mass ratio of the content of the organic solvent to the content of water in a material comprising ultrafine cellulose fibers within a predetermined range. The present invention has been completed based on these findings.

That is, the present invention provides the following inventions.

(E-1) A material comprising ultrafine cellulose fibers, comprising ultrafine cellulose fibers, an organic solvent, and water, wherein the content of the ultrafine cellulose fibers is 5% by mass or more, and the mass ratio C1/C2 of the content C1 of the organic solvent to the content C2 of the water is 1 or more and 100 or less.
(E-2) The material comprising ultrafine cellulose fibers according to (E-1), wherein the organic solvent is isopropyl alcohol.
(E-3) The material comprising ultrafine cellulose fibers according to (E-1) or (E-2), wherein the mass ratio C1/C2 is 1 or more and 20 or less.
(E-4) The material comprising ultrafine cellulose fibers according to any one of (E-1) to (E-3), wherein the content of ultrafine cellulose fibers is 5% by mass or more and 98% by mass or less.
(E-5) The material comprising ultrafine cellulose fibers according to any one of (E-1) to (E-4), wherein the ultrafine cellulose fibers have an ionic substituent.
(E-6) The material comprising ultrafine cellulose fibers according to any one of (E-1) to (E-5), wherein the ultrafine cellulose fibers have a phosphoric acid group.
(E-7) The material comprising ultrafine cellulose fibers according to any one of (E-1) to (E-6), wherein the amount of a phosphoric acid group in the ultrafine cellulose fibers is 0.5 mmol/g or more.
(E-8) The material comprising ultrafine cellulose fibers according to any one of (E-1) to (E-7), wherein the haze value of a sample, which has been prepared by adding the material comprising ultrafine cellulose fibers to pure water to a solid concentration of 0.4% by mass, and stirring the mixture with a disperser under conditions of 1500 rpm and 5 minutes, is 20% or less.
(E-9) The material comprising ultrafine cellulose fibers according to any one of (E-1) to (E-8), which is in a particulate form.

Advantageous Effect of Invention

A material comprising ultrafine cellulose fibers of the present invention is superior in the dispersibility of fine particles in an aqueous medium containing the ultrafine cellulose fibers.

BRIEF DESCRIPTION OF DRAWING

FIG. 1 shows the relationship between the amount of NaOH dropped and the electrical conductivity of a fiber raw material.

EMBODIMENTS OF CARRYING OUT THE INVENTION

"Parts" and "%" represent a proportion based on mass (parts by mass, and % by mass), unless otherwise specified. The value relating to the mass of a fiber such as cellulose is based on the absolute dry mass (solid content), unless otherwise specified. A numerical range expressed by "x to y" includes the values of x and y in the range, unless otherwise specified. "A or/and B" means at least one of A and B unless otherwise specified, namely A alone, or B alone, or both A and B.

<Cellulose Fiber Raw Material>

Although there is no particular restriction on a cellulose fiber raw material for yielding cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), soda pulp (AP), unbleached kraft pulp (UKP), oxygen bleached kraft pulp (OKP), and dissolving pulp (DP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred, but not particularly limited thereto, because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected, but without any particular limitation thereto. A sheet containing the ultrafine cellulose fibers having a long fiber length with a high aspect ratio exhibits a high strength.

<Ionic Substituent>

Ultrafine cellulose fibers used according to the present invention preferably have an ionic substituent, but are not particularly limited thereto.

The ionic substituent may be either of an anionic substituent and a cationic substituent, but is preferably an anionic substituent.

Although there is no particular restriction on a method for introducing an anionic substituent into cellulose fibers, and examples thereof include an oxidation treatment, and a treatment by a compound capable of forming a covalent bond with a functional group in cellulose.

The oxidation treatment is a treatment to convert a hydroxy group in cellulose to an aldehyde group, or a carboxy group. Examples of the oxidation treatment include a TEMPO (2,2,6,6-tetramethylpiperidine-1-oxyl radical) oxidation treatment, and a treatment using various oxidizing agents (sodium chlorite, ozone, etc.). As an example of the oxidation treatment, there is a method described in Biomacromolecules 8, 2485-2491, 2007 (Saito et al.), without limitation thereto.

A treatment by a compound may be carried out by mixing a fiber raw material in a dry or wet state with a compound reactive with the fiber raw material so as to introduce the aforementioned substituent into the fiber raw material. In order to promote the reaction during introduction, a method with heating is particularly effective. Although there is no particular restriction on the heating temperature in introducing a substituent, it is preferably in a temperature range, in which thermal decomposition, hydrolysis, or the like of the fiber raw material scarcely occurs. For example, from the viewpoint of the thermal decomposition temperature of cellulose, it is preferably 250° C. or less, and from the viewpoint of suppression of hydrolysis of cellulose, a heat treatment between 100 and 170° C. is preferred.

There is no particular restriction on a compound reactive with a fiber raw material, insofar as ultrafine fibers may be formed and an anionic substituent may be introduced.

Examples of a compound reactive with a fiber raw material in introducing an anionic substituent include a compound having a group derived from phosphoric acid, a compound having a group derived from a carboxylic acid, a compound having a group derived from sulfuric acid, and a compound having a group derived from a sulfonic acid. From the viewpoint of ease of handling and reactivity with fibers, a compound having at least one selected from the group consisting of a group derived from phosphoric acid, a group derived from a carboxylic acid, and a group derived from sulfuric acid is preferred. It is more preferred that these compounds thim an ester or/and an ether with a fiber, without any particular limitation thereto.

Although there is no particular restriction on the amount of a substituent introduced (by a titration method) in a fiber having introduced an anionic substituent, it is preferably $0.005\alpha$ to $0.11\alpha$ per g (mass) of the fiber, and more preferably $0.01\alpha$ to $0.08\alpha$. When the amount of a substituent introduced is $0.005\alpha$ or more, ultrafine fiber formation (defibration) of a fiber raw material becomes easy, and when the amount of a substituent introduced is $0.11\alpha$ or less, dissolution of fibers may be suppressed. In this regard, $\alpha$ is an amount (unit: mmol/g) of a functional group, with which a compound reactive with a fiber material can react, such as a hydroxyl group, and an amino group, contained per g of the fiber material.

Measurement of the amount (titration method) of a substituent introduced on the fiber surface may be carried out by the following method, unless otherwise specified:

A slurry of ultrafine fibers, which contains approx. 0.04 g of solid content in terms of absolute dry mass, is weighed out, and diluted to about 50 g with ion exchanged water. Into the solution a 0.01 N aqueous solution of sodium hydroxide is dropped with stirring, and a change of the electrical conductivity is measured, and the dropped amount of the 0.01 N aqueous solution of sodium hydroxide at the point where the electrical conductivity hits the minimum is defined as the dropped amount at the titration end point. The amount X of the substituent on the cellulose surface is represented by X (mmol/g)=0.01 (mol/L)×V (mL)/W (g). Where, V is a dropped amount (mL) of the 0.01 N aqueous solution of sodium hydroxide, and W is a solid content (g) contained in a slurry of ultrafine cellulose fibers.

The conductometric titration confers a curve shown in FIG. 1 as an alkali is added. First, the electrical conductivity is rapidly reduced (hereinafter, this region is referred to as the "first region"). Then, the conductivity starts rising slightly (hereinafter, this region is referred to as the "second region"). Then, the increment of the conductivity is increased (hereinafter, this region is referred to as the "third region"). The boundary point between the second region and the third region is defined as a point at which the secondary differential value of conductivity, that is, the change in the increment (gradient) of conductivity becomes maximum. In short, three regions appear. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "amount of the phosphoric acid group introduced (or amount of the phosphoric acid group)" or "amount of the substituent introduced (or amount of the substituent)" refers to the amount of the strongly acidic group.

When a substituent to be introduced is at least one selected from the group consisting of a group derived from phosphoric acid, a group derived from a carboxylic acid, and a group derived from sulfuric acid, there is no particular restriction on the amount of the substituent introduced. It may be 0.001 to 5.0 mmol/g, or also 0.005 to 4.0 mmol/g, or further 0.01 to 2.0 mmol/g. When the introduced substituent is a phosphoric acid group, the amount of phosphoric acid group on ultrafine cellulose fibers is preferably 0.5 mmol/g or more, more preferably 0.5 to 5.0 mmol/g, and further preferably 0.5 to 2.0 mmol/g.

When a compound having a group derived from phosphoric acid is used as a compound reactive with a fiber raw material, although there is no particular limitation, it is at least one selected from the group consisting of phosphoric acid, polyphosphoric acid, phosphorous acid, phosphonic acid, polyphosphonic acid, and the salts and esters thereof. Among them, a compound having a phosphoric acid group is preferred, although not particularly limited thereto, since it is inexpensive, easy to handle, and may improve the efficiency in formation of ultrafine fibers (defibration) by introducing a phosphoric acid group into a fiber raw material.

Although there is no particular restriction on a compound having a phosphoric acid group, examples thereof include phosphoric acid; and a lithium salt of phosphoric acid, such as lithium dihydrogen phosphate, di-lithium hydrogen phosphate, trilithium phosphate, lithium pyrophosphate, and lithium polyphosphate. Further included is a sodium salt of phosphoric acid, such as sodium dihydrogenphosphate, disodium hydrogenphosphate, trisodium phosphate, sodium pyrophosphate, and sodium polyphosphate. Further included is a potassium salt of phosphoric acid, such as potassium dihydrogenphosphate, dipotassium hydrogenphosphate, tripotassium phosphate, potassium pyrophosphate, and potassium polyphosphate. Further included is an ammonium salt of phosphoric acid, such as ammonium dihydrogen phosphate, diammonium hydrogen phosphate, ffiammonium phosphate, ammonium pyrophosphate, and ammonium polyphosphate.

Among these, phosphoric acid, a sodium salt of phosphoric acid, a potassium salt of phosphoric acid, an ammonium salt of phosphoric acid are preferred from the viewpoint of high efficiency in introduction of a phosphoric acid group and easy industrial applicability, and sodium dihydrogenphosphate, and disodium hydrogenphosphate are more preferred, but without any particular limitation thereto.

In addition, since the reaction uniformity and the introduction efficiency of a group derived from phosphoric acid are high, the compound is preferably used as an aqueous solution, but not particularly limited thereto. Although there is no particular restriction on the pH of the aqueous solution of the compound, it is preferably 7 or less because the efficiency of introducing a phosphoric acid group is high. From the viewpoint of suppression of hydrolysis of a fiber, pH 3 to 7 is particularly preferred, but without any particular limitation thereto.

When a compound having a group derived from a carboxylic acid is used as a compound reactive with a fiber raw material, there is no particular limitation thereon, but it is at least one selected from the group consisting of a compound having a carboxy group, an acid anhydride of a compound having a carboxy group, and derivatives thereof.

Although there is no particular restriction on a compound having a carboxy group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxy group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxy group, examples thereof include an imide of an acid anhydride of a compound having a carboxy group, and a derivative of an acid anhydride of a compound having a carboxy group. Although there is no particular restriction on the imide of an acid anhydride of a compound having a carboxy group, examples thereof include an imide of a dicarboxylic acid compound, such as maleimide, succinimide, and phthalimide.

There is no particular restriction on a derivative of an acid anhydride of a compound having a carboxy group. Examples thereof include an acid anhydride of a compound having a carboxy group, at least a part of the hydrogen atoms of which is substituted with a substituent (e.g. an alkyl group, and a phenyl group), such as dimethylmaleic anhydride, diethylmaleic anhydride, and diphenylmaleic anhydride.

Among the compounds having a group derived from a carboxylic acid, maleic anhydride, succinic anhydride and phthalic anhydride are preferred because they may be industrially applied easily, and easily gasified, but without any particular limitation thereto.

When a compound having a group derived from sulfuric acid is used as a compound reactive with a fiber raw material, although there is no particular limitation, it is at least one selected from the group consisting of sulfuric anhydride, sulfuric acid, and salts and esters thereof. Among them, sulfuric acid is preferred, since it is inexpensive, and can further improve the efficiency in formation of ultrafine fibers (defibration) by introducing a sulfate group into a fiber raw material, but without any particular limitation thereto.

When a cationic substituent is introduced, examples of a compound reactive with a fiber raw material include a compound having a group derived from an onium salt, such as an ammonium salt, a phosphonium salt, and a sulfonium salt. Specific examples thereof include a compound having a group including ammonium, such as a primary ammonium salt, a secondary ammonium salt, a tertiary ammonium salt, and a quaternary ammonium salt, phosphonium, or sulfonium. From the viewpoint of ease of handling and reactivity with fibers, preferred examples of the group include a group derived from a quaternary ammonium salt, and a group derived from a phosphonium salt. Measurement of the amount of a cationic substituent introduced may be carried out, for example, by an elemental analysis.

According to the present embodiment, a cationic substituent may be introduced into a fiber raw material, for example, by adding a cationizing agent and an alkaline compound to a fiber raw material and causing a reaction. As the cationizing agent, one having a group reactive with a quaternary ammonium group and a hydroxy group of cellulose may be used. Examples of the group reactive with a hydroxyl group of cellulose include an epoxy group, a functional group having a structure of halohydrin, a vinyl group, and a halogen group.

Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

An alkaline compound used in the cationization step contributes to promotion of the cationization reaction. The alkaline compound may be either of an inorganic alkaline compound and an organic alkaline compound.

Examples of an inorganic alkaline compound include an alkali metal hydroxide or alkaline earth metal hydroxide, an alkali metal carbonate or alkaline earth metal carbonate, and an alkali metal phosphate or alkaline earth metal phosphate.

Examples of an alkali metal hydroxide include lithium hydroxide, sodium hydroxide, and potassium hydroxide. Examples of an alkaline earth metal hydroxide include calcium hydroxide.

Examples of an alkali metal carbonate include lithium carbonate, lithium hydrogen carbonate, potassium carbonate, potassium hydrogen carbonate, sodium carbonate, and sodium hydrogen carbonate. Examples of an alkaline earth metal carbonate include calcium carbonate.

Examples of an alkali metal phosphate include lithium phosphate, potassium phosphate, trisodium phosphate, and disodium hydrogen phosphate. Examples of an alkaline earth metal phosphate include calcium phosphate, and calcium hydrogen phosphate.

Examples of an organic alkaline compound include ammonia, an aliphatic amine, an aromatic amine, an aliphatic ammonium, an aromatic ammonium, a heterocyclic compound and a hydroxide, a carbonate, and a phosphate thereof.

Specific examples thereof include ammonia, hydrazine, methylamine, ethylamine, diethylamine, triethylamine, propylamine, dipropylamine, butylamine, diaminoethane, diaminopropane, diaminobutane, diaminopentane, diaminohexane; cyclohexylamine, aniline, tetramethylammonium hydroxide, tetraethylammonium hydroxide, tetrapropylammonium hydroxide, tetrabutylammonium hydroxide, and benzyltrimethylammonium hydroxide; pyridine, N, N-dimethyl-4-aminopyridine; ammonium carbonate, ammonium hydrogen carbonate, and diammonium hydrogen phosphate.

These alkaline compounds may be used singly or in combination of two or more.

Among the above alkaline compounds, sodium hydroxide and potassium hydroxide are preferred because a cationization reaction may occur easily and the cost is low. Although the amount of the alkaline compound varies depending on the type of the alkaline compound, it is, for example, within the range of 1 to 10% by mass with respect to the absolute dry mass of the pulp.

A cationizing agent and an alkaline compound should be preferably formed into a solution, because it can be easily added to pulp. A solvent used for forming a solution may be either of water and an organic solvent, but a polar solvent (water, or a polar organic solvent such as alcohol) is preferred, and an aqueous solvent containing at least water is more preferred.

In the present production method, the amount of the solvent material per g of absolute dry pulp mass at the initiation of the cationization reaction is preferably 5 to 150 mmol. The amount of substance of the solvent is more preferably 5 to 80 mmol, and further preferably 5 to 60 mmol. In order to make the pulp content during the cationization reaction fall within the above range, for example, pulp with a high net content (i.e. low moisture content) can be used. It is also preferred to reduce the amount of the solvent contained in the solution of a cationizing agent and an alkaline compound.

The reaction temperature in a cationization step is preferably in a range of 20 to 200° C., and more preferably in a range of 40 to 100° C. Insofar as the reaction temperature is not lower than the lower limit, sufficient reactivity is obtained, and insofar as the reaction temperature is not higher than the upper limit, the reaction can be easily controlled. It also has the effect of suppressing the coloring of the pulp after the reaction. Although the time of the cationization reaction varies depending on the type of pulp and cationizing agent, the content of pulp, the reaction temperature, and the like, it is usually within the range of 0.5 to 3 hours.

The cationization reaction may be carried out in a closed system or in an open system. In addition, the solvent may be evaporated during the reaction, and the amount of the solvent material per g of absolute dry pulp mass at the end of the reaction may be lower than that at the initiation of the reaction.

By introducing an ionic substituent into a fiber raw material, the dispersibility of fibers in a solution is improved and the defibration efficiency may be improved.

<Ultrafine Fiber Formation Treatment of the Cellulose Fibers>

An ultrafine cellulose fiber slurry can be produced by subjecting the cellulose fibers to an ultrafine fiber formation (defibration) treatment.

In the ultrafine fiber formation treatment, the cellulose fibers are dispersed in a solvent.

Specific examples of the solvent include water, organic solvents singly and mixtures of water and organic solvents. The organic solvents are not especially limited as long as being able to secure an intended relative permittivity. Examples of the organic solvents include alcohols, polyhydric alcohols, ketones, ethers, dimethyl sulfoxide (DMSO), dimethylformamide (DMF) and dimethylacetoamide (DMAc). The alcohols include methanol, ethanol, n-propanol, isopropanol, n-butanol and t-butyl alcohol. The polyhydric alcohols include ethylene glycol and glycerin. The ketones include acetone and methyl ethyl ketone. The ethers include diethyl ether, tetrahydrofuran, ethylene glycol monomethyl ether, ethylene glycol monoethyl ether, ethylene glycol mono-n-butyl ether and ethylene glycol mono-t-butyl ether. The organic solvents may be used singly or concurrently in two or more. Among these, a preferred solvent is water.

The dispersion concentration of the cellulose fibers in the solvent is preferably 0.1 to 20% by mass, and more preferably 0.5 to 10% by mass. This is because when the dispersion concentration is 0.1% by mass or higher, the efficiency of a defibration treatment is improved; and when 20% by mass or lower, clogging in a defibration treatment device can be prevented.

The defibration treatment device is not especially limited. Examples thereof include a high-speed defibrating machine, a grinder (a stone mortar type pulverizer), a high-pressure homogenizer, an ultrahigh-pressure homogenizer, a high-pressure collision type pulverizer, a ball mill, a bead mill, a disc-type refiner and a conical refiner. There can also suitably be used a twin-screw kneader, a vibration mill, a homomixer under high speed rotation, an ultrasonic dispersing machine, a wet milling device such as a beater, and the like.

The ultrafine cellulose fiber slurry is obtained by the ultrafine fiber formation treatment. The average fiber width of the obtained ultrafine cellulose fibers is not especially limited, but can be set at, for example, 1 to 1000 nm, and is preferably 2 to 1000 nm, more preferably 2 to 500 nm, and still more preferably 3 to 100 nm. When the average fiber width of the ultrafine fibers is 1 nm or larger, since the dissolution of molecules into water is suppressed, the physical properties (strength, rigidity, dimensional stability) as the ultrafine fibers are sufficiently developed. On the other hand, when the average fiber width is 1000 nm or smaller, merits (high transparency, high elastic modulus, low linear expansion coefficient, flexibility) as the ultrafine fibers are easily exhibited. Here, the obtained ultrafine cellulose fiber dispersion is allowed to contain cellulose fibers having a fiber width exceeding 1000 nm, but preferably contains no cellulose fibers having a fiber width exceeding 1000 nm. Here, the ultrafine cellulose fibers are cellulose monofibers having a fiber width of, for example, 1000 nm or smaller.

The ultrafine cellulose fiber dispersion may contain cellulose fibers (referred to also as coarse cellulose fibers) having a fiber width exceeding 1000 nm (1 μm). The fiber width of the coarse cellulose fibers is not especially limited as long as being larger than 1 μm, but is preferably 5 μm or larger, and more preferably 10 μm or larger. Here, the coarse cellulose fibers are cellulose fibers having a fiber width exceeding 1000 nm, and include ones having branched portions having a width of 1000 nm or smaller on their surface.

In applications requiring transparency of ultrafine fibers, when the average fiber width is 30 nm or smaller, the width approaches 1/10 of the wavelengths of visible light and in the case where the ultrafine fibers are composited with a matrix material, refraction and scattering of visible light at the interface are unlikely to occur and the composite having high transparency tends to be obtained. Hence, the average fiber width is not especially limited, but is preferably 2 nm to 30 nm, and more preferably 2 to 20 nm. The composite obtained from the ultrafine fibers as described above, since generally making a compact structure, is high in the strength and because of little visible light scattering, can provide high transparency.

The measurement of the average fiber width is carried out as follows. A slurry containing ultrafine fibers of 0.05 to 0.1% by mass in concentration is prepared, and the prepared slurry is then cast on a carbon film-coated grid which has been subjected to a hydrophilic treatment to thereby make a sample for TEM observation. In the case where the slurry contains fibers having large widths, the SEM image of the surface of the slurry cast on a glass may be observed. The sample is observed by electron microscopy imaging at a magnification of 1000, 5000, 10000, 20000 or 50000, depending on the width of fibers constituting the sample. Provided that the sample, the observation condition and the magnification are adjusted so as to meet the following conditions.
(1) A single straight line X is drawn in any given portion in an observation image, and 20 or more fibers intersect with the straight line X.
(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width is an average value of the fiber widths thus read.

The fiber length is not especially limited, but is preferably 0.1 μm or longer. A fiber length of 0.1 μm or longer is preferred in that when a sheet described later is produced, the tear strength of the sheet is sufficient. The fiber length can be determined by image analysis of TEM, SEM and AFM. The above fiber length is a fiber length of fibers accounting for 30% by mass or more in the ultrafine fibers.

Further the fiber length of the above-mentioned coarse cellulose fibers is not especially limited, but is preferably 10 μm or longer.

The axial ratio (fiber length/fiber width) of the fibers is not especially limited, but is preferably in the range of 20 to 10000. An axial ratio of 20 or higher is preferred in that an ultrafine fiber-containing sheet is easy to form. An axial ratio of 10000 or lower is preferred in that the slurry viscosity becomes low.

By the ultrafine fiber formation treatment, the ultrafine cellulose fiber slurry is obtained. The concentration of the ultrafine cellulose fibers here is, for example, 0.1 to 20% by mass, and may be 0.2 to 10% by mass, or may also be 0.5 to 10% by mass.

<Dehydration>

By subjecting the ultrafine cellulose fiber slurry obtained in the above to a dehydration treatment, there can be prepared a material comprising ultrafine cellulose fibers having a content of the ultrafine cellulose fibers according to the present invention of 80% by mass or higher, or a material comprising ultrafine cellulose fibers having a content of the ultrafine cellulose fibers according to the present invention of 5% by mass or higher. That is, according to the present invention, there is also provided a method for producing the material comprising ultrafine cellulose fibers of the present invention, the method comprising a step of gelating a dilution containing ultrafine cellulose fibers, a step of obtaining a concentrate containing the ultrafine cellulose fibers from the gelated substance obtained in the above, and a step of heating the concentrate. Further according to the present invention, there is also provided a method for producing the material comprising ultrafine cellulose fibers of the present invention, the method comprising a step of gelating a dilution containing ultrafine cellulose fibers, and a step of obtaining a concentrate containing the ultrafine cellulose fibers from the gelated substance obtained in the above.

Then, by subjecting the ultrafine cellulose fiber slurry obtained in the above to a dehydration treatment and a powdering/granulation treatment, there can be prepared a material comprising ultrafine cellulose fibers having a content of the ultrafine cellulose fibers according to the present invention of 5% by mass or higher. That is, according to the present invention, there is also provided a method for producing the material comprising ultrafine cellulose fibers of the present invention, the method comprising a step of gelating a dilution containing ultrafine cellulose fibers, a step of obtaining a concentrate containing the ultrafine cellulose fibers from the gelated substance obtained in the above, a step of heating the concentrate, and a step of crushing the concentrate.

The above gelation step can be carried out by adding a concentrating agent or a solvent (organic solvent or the like) to the dilution containing the ultrafine cellulose fibers, but is not especially limited. The step of obtaining a concentrate containing the ultrafine cellulose fibers from the gelated substance can be carried out by filtering and then compressing the gelated substance, but is not especially limited. The step of heating the concentrate can be carried out by heating by an oven or the like, but is not especially limited.

The dehydration treatment method is not especially limited, but examples thereof include the following methods.

(1) A concentrating agent is added to a dilution containing the ultrafine cellulose fibers to thereby gelate the dilution, and the gelated dilution is filtered and then compressed to thereby obtain a concentrate. The concentrate is treated with an acid, and then treated with an alkali to thereby obtain a concentrate. A solvent is added to the concentrate and filtered to thereby obtain a concentrate, and the obtained concentrate is heated by an oven or the like, and the material comprising ultrafine cellulose fibers of the present invention can thereby be obtained.

(2) A concentrating agent is added to a dilution containing the ultrafine cellulose fibers to thereby gelate the dilution, and the gelated dilution is filtered and then compressed to thereby obtain a concentrate. The obtained concentrate is heated by an oven or the like, and the material comprising ultrafine cellulose fibers of the present invention can thereby be obtained.

(3) A concentrating agent is added to a dilution containing the ultrafine cellulose fibers to thereby gelate the dilution, and the gelated dilution is filtered and then compressed to thereby obtain a concentrate. The concentrate is treated with an alkali to thereby obtain a concentrate. A solvent is added to the concentrate and filtered to thereby obtain a concentrate. The step of adding the solvent and filtering to obtain a concentrate may be carried out twice or more. From the viewpoint of suppressing the content rate of non-dispersed components, it is more preferred to twice or more carry out the step of adding the solvent and filtering to obtain a concentrate. The obtained concentrate is heated by an oven or the like, and the material comprising ultrafine cellulose fibers of the present invention can thereby be obtained.

(4) A solvent is added to a dilution containing the ultrafine cellulose fibers to thereby gelate the dilution, and the gelated dilution is filtered to thereby obtain a filtrand. The solvent is again added to the filtrand, and filtered to thereby obtain a filtrand. From the viewpoint of improving the dispersibility of fine particles, the addition of the solvent and the operation of the filtering are carried out, as desired, preferably twice or more, and more preferably three or more times. The obtained filtered filtrand is heated by an oven or the like, and the material comprising ultrafine cellulose fibers of the present invention can thereby be obtained.

Examples of the above concentrating agent include acids, alkalis, salts of polyvalent metals, cationic surfactants, anionic surfactants, cationic polymer coagulants and anionic polymer coagulants. Among these, the concentrating agent is preferably a salt of a polyvalent metal. Specific examples of salts of polyvalent metals will be described later in the present description.

A filtration treatment is preferably carried out after the addition of a concentrating agent, but the treatment is not especially limited. Alternatively, a filtration treatment is preferably carried out after a solvent is added to a dilution containing the ultrafine cellulose fibers to gelate the dilution, but the treatment is not especially limited. Further, a compression step is preferably carried out after the filtration treatment step, but the step is not especially limited. Providing a compression step enables regulation of the content of moisture in a concentrate in a preferred range.

As a compression device, there can be used a usual press machine such as a belt press, a screw press or a filter press, and the device is not especially limited.

A filter material to be used is not especially limited, but there can be used a stainless steel-made, filter paper-made, polypropylene-made, nylon-made, polyethylene-made or polyester-made one, or the like. Since an acid is used in some cases, a polypropylene-made filter material is preferred.

The air permeability of the filter material is, since a lower air permeability makes the yield higher, 30 $cm^3/cm^2 \cdot sec$ or lower, more preferably 10 $cm^3/cm^2 \cdot sec$ or lower, and still more preferably 1 $cm^3/cm^2 \cdot sec$ or lower.

Since a low concentration of a raw material to be subjected to the compression step causes an increase in the amount of a filtrate for dehydration and a time elongation of the dehydration step, the concentration is 0.5% or higher, more preferably 1% or higher, and still more preferably 2% or higher.

The pressure in the compression is 0.2 MPa or higher, and more preferably 0.4 MPa or higher.

The concentrate obtained in the above can also be subjected to a step of treatment with an acid and/or a step of treatment with an alkali. The step of treatment with an acid is preferably provided before or after the above filtration treatment step, and preferably provided after the filtration treatment step.

An acid usable in the step of treatment with an acid will be described later in the present description. Specifically, the concentrate obtained in the above-mentioned step is preferably dipped in an acidic liquid containing an acid. The concentration of the acidic liquid to be used is not especially limited, but is preferably 10% by mass or lower, more preferably 5% by mass or lower, and still more preferably 1% by mass or lower. By adjusting the concentration of the acidic liquid within the above range, the deterioration due to the decomposition of cellulose can be suppressed.

An alkali usable in the step of treatment with an alkali will be described later in the present description. Specifically, the concentrate obtained in the above-mentioned step or the concentrate treated with an acid is preferably dipped in an alkaline liquid containing an alkali. The concentration of the alkaline liquid to be used is not especially limited, but is preferably 10% by mass or lower, more preferably 5% by mass or lower, and still more preferably 1% by mass or lower. By adjusting the concentration of the alkaline liquid within the above range, the deterioration due to the decomposition of cellulose can be suppressed.

Filtration is preferably after the above step of treatment with an acid and the above step of treatment with an alkali. In the filtration treatment step, a compression step may further be carried out.

In the present invention, a drying step may further be provided. The drying step is preferably an oven-drying step, and is preferably carried out, for example, in an oven set at 30 to 70° C. for 1 to 60 minutes. Then in the case of a material comprising ultrafine cellulose fibers of a fourth embodiment described later, the drying is preferably carried out, for example, in an oven set at 30 to 70° C. for 1 to 120 minutes, and more preferably for 10 to 90 minutes.

In the case of crushing the concentrate, in a step of crushing the concentrate, as a crushing machine, there is used a cutter mill, a hammer mill, a pin mill, a ball mill, a jet mill, a mixer or the like, but the crushing machine is not especially limited. The concentrate is crushed to such a degree that the concentrate nearly thoroughly passes through a sieve having an opening of 2 mm. More preferably, the concentrate is crushed so as to nearly thoroughly pass through a sieve having an opening of 425 μm.

<Materials Comprising Ultrafine Cellulose Fibers>
(Material Comprising Ultrafine Cellulose Fibers of a First Embodiment)

A material comprising ultrafine cellulose fibers of a first embodiment of the present invention is a material comprising ultrafine cellulose fibers having a content of the ultrafine cellulose fibers of 80% by mass or higher, wherein the haze value of the following sample is 20% or lower. Here, the sample is one prepared by adding the material comprising ultrafine cellulose fibers in pure water so that the solid concentration becomes 0.4% by mass, and stirring the mixture by a disperser under conditions of 1500 rpm and 5 minutes.

In the present invention, the content of the ultrafine cellulose fibers is 80% by mass or higher. That is, the material comprising ultrafine cellulose fibers of the present invention is one obtained by highly concentrating the ultrafine cellulose fibers. The upper limit of the content of the ultrafine cellulose fibers is not especially limited, but the content of the ultrafine cellulose fibers is preferably 95% by mass or lower.

The haze value of a sample, which is prepared by adding the material comprising ultrafine cellulose fibers of the present invention in pure water so that the solid concentration becomes 0.4% by mass, and stirring the mixture by a disperser under conditions of 1500 rpm and 5 minutes, is 20% or lower. The lower limit of the haze value is not especially limited, but is preferably 0.1% or higher, more preferably 0.2% or higher, and still more preferably 0.5% or higher.

The present invention comprises controlling the haze value of a sample at 20% or lower where the sample is prepared under a predetermined condition from the material comprising ultrafine cellulose fibers obtained by highly concentrating the ultrafine cellulose fibers as described above. This successfully leads to the improvement in the dispersibility of fine particles in an aqueous medium containing the ultrafine cellulose fibers.

The disperser is not especially limited as long as being a usual dispersing machine, but a stirring machine such as a homomixer or a Three-One Motor is used.
(Material Comprising Ultrafine Cellulose Fibers of a Second Embodiment)

A material comprising ultrafine cellulose fibers of a second embodiment of the present invention is a material comprising ultrafine cellulose fibers having a content of the ultrafine cellulose fibers of 5% by mass or higher, wherein the following sample satisfies the following condition A and condition B.

Condition A: the viscosity measured at 3 rpm and at 25° C. by using a B-type viscometer is 2800 mPa·s or higher.

Condition B: the haze value is 10% or higher and 50% or lower, where the sample is one prepared by adding the material comprising ultrafine cellulose fibers in pure water so that the solid concentration becomes 0.4% by mass, and stirring the mixture by a disperser under conditions of 1500 rpm and 5 minutes.

In the present invention, the content of the ultrafine cellulose fibers suffices if being 5% by mass or higher, and the upper limit thereof is not especially limited, but is preferably 95% by mass or lower. The content of the ultrafine cellulose fibers is preferably 10% by mass or higher, more preferably 15% by mass or higher, and still more preferably 20% by mass or higher. The content of the ultrafine cellulose fibers may also be 30% by mass or higher, 40% by mass or higher, 50% by mass or higher, or 60% by mass or higher.

With respect to a sample prepared by adding the material comprising ultrafine cellulose fibers of the present invention in pure water so that the solid concentration becomes 0.4% by mass, and stirring the mixture by a disperser under conditions of 1500 rpm and 5 minutes, the viscosity measured at 3 rpm and at 25° C. by using a B-type viscometer is 2800 mPa·s or higher. The upper limit of the viscosity is not especially limited, but is preferably 30000 mPa·s or lower, more preferably 25000 mPa·s or lower, still more preferably 22000 mPa·s or lower, further still more preferably 21000 mPa·s or lower, and further still more preferably 20000 mPa·s or lower. The viscosity may also be 3000 mPa·s or higher, 5000 mPa·s or higher, 8000 Pa·s or higher, or 10000 mPa·s or higher.

The disperser is not especially limited as long as being a usual dispersing machine, but a stirring machine such as a homomixer or a Three-One Motor is used. The same is applied to the case of the measurement of haze described later.

The haze value of a sample, which is prepared by adding the material comprising ultrafine cellulose fibers of the present invention in pure water so that the solid concentration becomes 0.4% by mass, and stirring the mixture by a disperser under conditions of 1500 rpm and 5 minutes, is 10% or higher and 50% or lower. The lower limit value of the haze value is preferably 12% or higher, more preferably 14% or higher, and still more preferably 15% or higher, but is not especially limited. The upper limit value of the haze value is preferably 45% or lower, more preferably 40% or lower, still more preferably 35% or lower, and further still more preferably 30% or lower, but is not especially limited.

The present invention (second embodiment) comprises controlling the sample prepared under the predetermined condition by using the material comprising ultrafine cellulose fibers so that it satisfies both the above condition A and condition B. This successfully leads to the improvement in the dispersibility of fine particles in an aqueous medium containing the ultrafine cellulose fibers.
(Material Comprising Ultrafine Cellulose Fibers of a Third Embodiment)

A material comprising ultrafine cellulose fibers of a third embodiment of the present invention is a material comprising ultrafine cellulose fibers having a content of the ultrafine cellulose fibers of 5% by mass or higher, and is particulate and has a cumulative median diameter D50 of 1.2 mm or smaller. Here, the cumulative median diameter D50 can be controlled, for example, by suitably regulating the preparation method and the concentrating method of the material comprising ultrafine cellulose fibers, and the crushing method of the concentrate, and the like each.

In the present invention, the content of the ultrafine cellulose fibers is 5% by mass or higher. The upper limit of the content of the ultrafine cellulose fibers is not especially limited, and may be 100% by mass, and may also be lower than 100% by mass, and the content of the ultrafine cellulose fibers is preferably 99% by mass or lower. The upper limit of the content of the ultrafine cellulose fibers may also be 90% by mass or lower, 80% by mass or lower, 70% by mass or lower, 60% by mass or lower, or 50% by mass or lower, but is not especially limited. The lower limit of the content of the ultrafine cellulose fibers is not especially limited as long as being 5% by mass or higher, and may also be 10% by mass or higher, 15% by mass or higher, or 20% by mass or higher.

The material comprising ultrafine cellulose fibers of the present invention is particulate. Being particulate refers to being composed of a powdery substance and/or a granular substance. The powdery substance refers to a substance finer than the granular substance. Generally, the powdery substance refers to fine particles having a particle diameter of 1 nm or larger and smaller than 0.1 mm, and the granular substance refers to particles having a particle diameter of 0.1 to 10 mm, but these are not especially limited thereto. Here, being particulate is not necessarily being globular. The particle diameter of the particulate material in the description of the present application can be measured by the following method. The particle diameter of the particulate material in the description of the present application is defined by a value measured by using a laser diffraction scattering-type particle diameter distribution analyzer (Microtrac3300EXII, manufactured by Nikkiso Co., Ltd.)

The cumulative median diameter D50 of the material comprising ultrafine cellulose fibers of the present invention suffices if being 1.2 mm or smaller, and the lower limit thereof is not especially limited, but the cumulative median diameter D50 is preferably 50 μm or larger. The cumulative median diameter D50 may also be 100 μm or larger, 200 μm or larger, 300 μm or larger, 400 μm or larger, 500 μm or larger, 600 μm or larger, or 700 μm or larger. The cumulative median diameter D50 may also be 1000 μm or smaller, 900 μm or smaller, or 800 μm or smaller.

By adjusting the cumulative median diameter within the above range, the surface area of particles contained in the material comprising ultrafine cellulose fibers can be adjusted within an appropriate range; the contact area with a disperse medium such as water can be made large; and the redispersibility can be made high. Further, by adjusting the cumulative median diameter within the above range, the unintentional aggregation of the particles can be suppressed; and the redispersibility can be made high. Good dispersibility of fine particles becomes thus enabled to be achieved, even in an aqueous medium obtained by adding the material comprising ultrafine cellulose fibers thereto and stirring the mixture in a short time.

The volume-average diameter of the material comprising ultrafine cellulose fibers of the present invention is preferably 20 μm or larger and 1500 μm or smaller, and more preferably 50 μm or larger and 1200 μm or smaller, but is not especially limited.

The number-average diameter of the material comprising ultrafine cellulose fibers of the present invention is preferably 10 μm or larger and 100 μm or smaller, and more preferably 20 μm or larger and 500 μm or smaller, but is not especially limited.

The area-average diameter of the material comprising ultrafine cellulose fibers of the present invention is preferably 10 μm or larger and 1000 μm or smaller, and more preferably 30 μm or larger and 800 μm or smaller, but is not especially limited.

The haze value of a sample, which is prepared by adding the material comprising ultrafine cellulose fibers of the present invention in pure water so that the solid concentration becomes 0.4% by mass, and stirring the mixture by a disperser under conditions of 1500 rpm and 5 minutes, is preferably 20% or lower, but is not especially limited thereto. The lower limit of the haze value is not especially limited, but is preferably 0.1% or higher, more preferably 0.2% or higher, and still more preferably 0.5% or higher. In the present invention, by making the haze value meet the above condition, the dispersibility of fine particles in an aqueous medium containing the ultrafine cellulose fibers can further be improved.

The disperser is not especially limited as long as being a usual dispersing machine, but a stirring machine such as a homomixer or a Three-One Motor is used.

In the material comprising ultrafine cellulose fibers of the present invention, the specific surface area is preferably 0.005 $m^2/cm^3$ or larger and 0.5 $m^2/cm^3$ or smaller, but is not especially limited. The specific surface area is more preferably 0.008 $m^2/cm^3$ or larger and 0.5 $m^2/cm^3$ or smaller, and still more preferably 0.04 $m^2/cm^3$ or larger and 0.2 $m^2/cm^3$ or smaller.

By adjusting the specific surface area within the above range, when the material comprising ultrafine cellulose fibers is added and redispersed in a solvent, the sufficient contact area with the solvent is secured and the material is homogeneously hydrated. Consequently, the ultrafine cellulose fibers are homogeneously dispersed in the solvent, and the dispersibility of the fine particles added in the system can be improved. On the other hand, when the specific surface area is too large, the bulk density decreases and worsening of handleability, dusting and the like are caused.

Here, the specific surface area, and the angle of repose and the bulk density described later can be controlled, for example, by suitably regulating the preparation method and the concentrating method of the material comprising ultrafine cellulose fibers, the crushing method of the concentrate and the like each.

The angle of repose of the material comprising ultrafine cellulose fibers of the present invention is preferably 4 to 50°, but is not especially limited. The angle of repose is more preferably 5 to 45°, still more preferably 5 to 40°, and further still more preferably 10 to 40°. The angle of repose is a parameter participating in the fluidity of the material comprising ultrafine cellulose fibers. Although a smaller angle of repose tends to give a more enhanced fluidity of the material comprising ultrafine cellulose fibers, even in the case where the angle of repose is small, when a large amount of fine particles is present in the material comprising ultrafine cellulose fibers, the fluidity (feedability) worsens because dusting occurs.

The angle of repose is measured by using an angle of repose tester (AS ONE Corporation). Specifically, the material comprising ultrafine cellulose fibers in an amount of 100 ml is placed in the chute of the angle of repose tester, and the chute gate is opened to drop downward the material comprising ultrafine cellulose fibers. Then, an angle made by the dropped material comprising ultrafine cellulose fibers and the horizontal plane is measured, which is defined as an angle of repose of the material comprising ultrafine cellulose fibers.

The bulk density of the material comprising ultrafine cellulose fibers of the present invention is preferably 0.1 to 0.5 g/ml, more preferably 0.1 to 0.4 g/ml, and still more preferably 0.1 to 0.3 g/ml, but is not especially limited. A higher bulk density tends to give a smaller particle diameter of the particles constituting the material comprising ultrafine cellulose fibers. Hence, the contact area with a disperse medium such as water can be made large and the redispersibility is enhanced. On the other hand, when the bulk density is too high, the particles in the material comprising ultrafine cellulose fibers cause unintentional aggregation in some cases, which is not preferred. Then, when the bulk density is too low, since the shapes of the particles tend to become nonuniform and the particle diameter becomes large, the fluidity (feedability) worsens.

The bulk density is measured by using the angle of repose tester (AS ONE Corporation). Specifically, the material comprising ultrafine cellulose fibers in an amount of 100 ml is placed in the chute of the angle of repose tester, and the chute gate is opened to drop downward the material comprising ultrafine cellulose fibers to fill a container (full volume V=50 ml) placed on the bottom to form a heap. Then, the heap of the material comprising ultrafine cellulose fibers is leveled off to fill the space just full. The mass of the material comprising ultrafine cellulose fibers remaining in the container is weighed and the bulk density (g/ml) is calculated from the following expression.

Bulk density (g/ml)=Mass (g) of a powder/Volume (ml) of powder (Material Comprising Ultrafine Cellulose Fibers of a Fourth Embodiment)

A material comprising ultrafine cellulose fibers of a fourth embodiment of the present invention is a material comprising ultrafine cellulose fibers having a content of the ultrafine cellulose fibers of 5% by mass or higher, wherein the material comprising ultrafine cellulose fibers has a content rate of non-dispersed components defined by the following of 20% or lower.

Content rate of non-dispersed components (%)=100−(C/0.2)×100 wherein C is a solid concentration of a supernatant liquid obtained by centrifuging an aqueous dispersion containing 0.2% by mass in solid concentration of the material comprising ultrafine cellulose fibers by a high-speed refrigerated centrifugal separator under conditions of 12000 G and 10 minutes.

In the present invention, the content of the ultrafine cellulose fibers is 5% by mass or higher. The upper limit of the content of the ultrafine cellulose fibers is not especially limited, and may be 100% by mass or may be lower than 100% by mass. Preferably, the content of the ultrafine cellulose fibers is 95% by mass or lower.

The material comprising ultrafine cellulose fibers of the present invention suffices as long as having a content rate of non-dispersed components as defined in the present description of 20% or lower, and the lower limit value thereof is not especially limited; and the content rate of non-dispersed components may be, for example, 1% or higher, 3% or higher, or 5% or higher. Further the content rate of non-dispersed components may be, for example, 15% or lower.

By adjusting the content rate of non-dispersed components in the material comprising ultrafine cellulose fibers of the present invention within the above range, in the present invention, the dispersibility of fine particles in an aqueous medium containing the ultrafine cellulose fibers has been successfully improved. Here, the content rate of non-dispersed components can be controlled, for example, by suitably regulating the concentrating method of the material comprising ultrafine cellulose fibers and the composition including the amount of the solid content each. Then, in the case where the ultrafine cellulose fibers have ionic substituents, the kind and the amount of the substituents also can conceivably affect the content rate of non-dispersed components.

(Material Comprising Ultrafine Cellulose Fibers of a Fifth Embodiment)

A material comprising ultrafine cellulose fibers of a fifth embodiment of the present invention is a material comprising ultrafine cellulose fibers, the material comprising the ultrafine cellulose fibers, an organic solvent and water, has a content of the ultrafine cellulose fibers of 5% by mass or higher, wherein the mass ratio C1/C2 between the content C1 of the organic solvent and the content C2 of the water is 1 or higher and 100 or lower.

The mass ratio C1/C2 is preferably 1 or higher and 50 or lower, more preferably 1 or higher and 30 or lower, and still more preferably 1 or higher and 20 or lower.

The mass ratio C1/C2 can be controlled, for example, by suitably regulating the concentrating method of the ultrafine cellulose fibers, and the like. In the present embodiment, the mass ratio can be regulated, for example, by regulating the amount of an organic solvent to be added in the dehydration step, but the regulating method is not especially limited.

The ratio between the amount of water and the amount of an organic solvent when the organic solvent is added to a dilution containing the ultrafine cellulose fibers in the water to thereby gelate the dilution corresponds to the mass ratio C1/C2 between the content C1 of an organic solvent and the content C2 of water in the material comprising ultrafine cellulose fibers of the present invention.

A measuring method of the mass ratio of the material comprising ultrafine cellulose fibers is not especially limited, but for example, the following method can be used. The material comprising ultrafine cellulose fibers is dried and the absolute dry weight is measured to thereby determine the total amount A of the water and the organic solvent. Then, the material comprising ultrafine cellulose fibers is dispersed in water; thereafter, sodium chloride is added; a gas phase generated by bubbling nitrogen gas in a water bath at 85° C. is made to be absorbed in a methyl formate solution in a trapping device cooled by a refrigerant added with dry ice; and the amount C1 of the organic solvent of the absorbed liquid is quantitatively determined by GC/MS-SIM. The amount C2 of the water is calculated from A−C1.

In the present invention, with respect to the material comprising ultrafine cellulose fibers, by making the mass ratio C1/C2 between the content C1 of the organic solvent and the content C2 of the water 1 or higher and 100 or lower, the dispersibility of the fine particles in the aqueous medium containing the ultrafine cellulose fibers has been successfully improved.

In the present invention, the content of the ultrafine cellulose fibers is 5% by mass or higher. The upper limit of the content of the ultrafine cellulose fibers is not especially limited, but the content of the ultrafine cellulose fibers is preferably 99% by mass or lower, and more preferably 98% by mass or lower. The content of the ultrafine cellulose fibers may be 90% by mass or lower, 80% by mass or lower, 70% by mass or lower, 60% by mass or lower, 50% by mass or lower, or 40% by mass or lower. The content of the ultrafine cellulose fibers may be 10% by mass or higher, 15% by mass or higher, or 20% by mass or higher.

The material comprising ultrafine cellulose fibers of the present invention, since using, in the dehydration step, an organic solvent or a mixture of an organic solvent and water, results in containing the organic solvent. Examples of the organic solvent include alcohols, polyhydric alcohols, ketones, ethers, dimethyl sulfoxide (DMSO), dimethylformamide (DMF) and dimethylacetoamide (DMAc), but the organic solvent is not especially limited thereto. Examples of the alcohols include methanol, ethanol, n-propanol, isopropanol, n-butanol and t-butyl alcohol. Examples of the polyhydric alcohols include ethylene glycol and glycerol. Examples of the ketones include acetone and methyl ethyl ketone. Examples of the ethers include diethyl ether, tetrahydrofuran, ethylene glycol monomethyl ether, ethylene glycol monoethyl ether, ethylene glycol mono-n-butyl ether and ethylene glycol mono-t-butyl ether. The organic solvent may be used singly or concurrently in two or more. Among these, the solvent is preferably an alcohol or a mixture of an alcohol and water. The solvent is more preferably isopropyl alcohol.

The haze value of the sample, which is prepared by adding the material comprising ultrafine cellulose fibers of the present invention in pure water so that the solid concentration becomes 0.4% by mass, and stirring the mixture by a disperser under conditions of 1500 rpm and 5 minutes, is preferably 20% or lower, but is not especially limited. The lower limit of the haze value is not especially limited, but is preferably 0.1% or higher, more preferably 0.2% or higher, and still more preferably 0.5% or higher.

The disperser is not especially limited as long as being a usual dispersing machine, but a stirring machine such as a homomixer or a Three-One Motor is used.

(Explanation of the Materials Comprising Ultrafine Cellulose Fibers of the First to Fourth Embodiments)

In the case where an organic solvent is used as the solvent in the above dehydration step, there are cases where the materials comprising ultrafine cellulose fibers of the present invention obtained by the above treatments further contain the organic solvent. Further in the case where water is used as the solvent, there are cases where the materials comprising ultrafine cellulose fibers of the present invention obtained by the above treatments further contain water.

Examples of the solvent to be used in the hydration step include organic solvents and mixtures of an organic solvent and water. Examples of the organic solvents include alcohols, polyhydric alcohols, ketones, ethers, dimethyl sulfoxide (DMSO), dimethylformamide (DMF) and dimethylacetoamide (DMAc). Examples of the alcohols include methanol, ethanol, n-propanol, isopropanol, n-butanol and t-butyl alcohol. Examples of the polyhydric alcohols include ethylene glycol and glycerol. Examples of the ketones include acetone and methyl ethyl ketone. Examples of the ethers include diethyl ether, tetrahydrofuran, ethylene glycol monomethyl ether, ethylene glycol monoethyl ether, ethylene glycol mono-n-butyl ether and ethylene glycol mono-t-butyl ether. The organic solvent may be used singly or concurrently in two or more. Among these, the solvent is preferably an alcohol or a mixture of an alcohol and water. The solvent is more preferably isopropyl alcohol or a mixture of isopropyl alcohol and water.

In the case where the materials comprising ultrafine cellulose fibers of the present invention comprise an alcohol and water, from the viewpoint of cost reduction and suppression of the amount of the alcohol mixed, the mass ratio between the content of the alcohol and the water is preferably 1/5 to 5/1, and more preferably 1/3 to 1/1, but is not especially limited. The alcohol is preferably isopropyl alcohol.

(Explanation of the Materials Comprising Ultrafine Cellulose Fibers of the First to Fifth Embodiments)

In the case where a concentrating agent is used in the above dehydration step, there are cases where the materials comprising ultrafine cellulose fibers of the present invention obtained by the above treatments further contain the concentrating agent.

Examples of the concentrating agent include salts of polyvalent metals, cationic surfactants, anionic surfactants, cationic polymer coagulants and anionic polymer coagulants, but is not especially limited. In the case where a salt of a polyvalent metal is used as the concentrating agent, the material comprising ultrafine cellulose fibers of the present invention may further contain the polyvalent metal.

Examples of the polyvalent metal include aluminum, calcium or magnesium, but is not especially limited. Examples of the salt of a polyvalent metal include aluminum sulfate, polyaluminum chloride, calcium chloride, aluminum chloride, magnesium chloride, calcium sulfate and magnesium sulfate, but is not especially limited.

In the case where the materials comprising ultrafine cellulose fibers of the present invention contain a polyvalent metal, the content thereof is not especially limited, but is preferably 5 ppm or higher and 1000 ppm or lower, and more preferably 10 ppm or higher and 100 ppm or lower. Then in the materials comprising ultrafine cellulose fibers, the content of the polyvalent metal can also be set lower than 5 ppm, and an aspect of containing no polyvalent metal can also be adopted.

In the case where an acid is used in the above dehydration step, there are cases where the materials comprising ultrafine cellulose fibers of the present invention obtained by the above treatments further contain the acid.

As the acid, there can be used, for example, an inorganic acid, a sulfonic acid or a carboxylic acid. Examples of the inorganic acid include sulfuric acid, nitric acid, hydrochloric acid, hydrobromic acid, hydroiodic acid, hypochlorous acid, chlorous acid, chloric acid, perchloric acid, phosphoric acid and boric acid. Examples of the sulfonic acid include methanesulfonic acid, ethanesulfonic acid, benzenesulfonic acid, p-toluenesulfonic acid and trifluoromethanesulfonic acid. Examples of the carboxylic acid include formic acid, acetic acid, citric acid, gluconic acid, lactic acid, oxalic acid and tartaric acid.

In the case where the materials comprising ultrafine cellulose fibers of the present invention contain an acid, the content thereof is not especially limited, but is, with respect to the mass of the ultrafine cellulose fibers, preferably 0.01% by mass or higher and 0.14% by mass or lower. Then in the materials comprising ultrafine cellulose fibers, the content of the acid can be set lower than 0.01% by mass, and an aspect of containing no acid can also be adopted.

In the case where an alkali is used in the above dehydration step, there are cases where the materials comprising ultrafine cellulose fibers of the present invention obtained by the above treatments further contain the alkali.

The alkali may be either an inorganic alkali or an organic alkali.

Examples of the inorganic alkali include the following, but are not especially limited. Lithium hydroxide, sodium hydroxide, potassium hydroxide, calcium hydroxide, lithium carbonate, lithium hydrogencarbonate, potassium carbonate, potassium hydrogencarbonate, sodium carbonate, sodium hydrogencarbonate, calcium carbonate, calcium phosphate and calcium hydrogenphosphate.

Examples of the organic alkali include the following, but are not especially limited. Ammonia, hydrazine, methylamine, ethylamine, diethylamine, triethylamine, propylamine, dipropylamine, butylamine, diaminoethane, diaminopropane, diaminobutane, diaminopentane, diaminohexane; cyclohexylamine, aniline, tetramethylammonium hydroxide, tetraethylammonium hydroxide, tetrapropylammonium hydroxide, tetrabutylammonium hydroxide, benzyltrimethylammonium hydroxide; and pyridine and N,N-dimethyl-4-aminopyridine.

In the case where the materials comprising ultrafine cellulose fibers of the present invention contain an alkali, the content thereof is not especially limited, but is, with respect to the mass of the ultrafine cellulose fibers, preferably 0.01% by mass or higher and 2% by mass or lower. The content is more preferably 0.2% by mass or lower, and still more preferably 0.02% by mass or lower. Then in the materials comprising ultrafine cellulose fibers, the content of the alkali can be set lower than 0.01% by mass, and an aspect of containing no alkali can also be adopted.

In the materials comprising ultrafine cellulose fibers of the present invention, in the case where the ultrafine cellulose fibers are anionically modified, the counter ion of the functional group is desirably a sodium ion. By making the counter ion a sodium ion, the ultrafine cellulose fibers repel one another, making the aggregation hard to be caused.

The form of the materials comprising ultrafine cellulose fibers of the present invention is not especially limited, but is preferably particulate. Being particulate refers to being composed of a powdery substance and/or a granular substance. The powdery substance refers to a substance finer than the granular substance. Generally, the powdery substance refers to fine particles having a particle diameter of 1 nm or larger and smaller than 0.1 mm, and the granular substance refers to particles having a particle diameter of 0.1 to 10 mm, but these are not especially limited thereto. Here, being particulate is not necessarily being globular. The particle diameter of the particulate material in the specification of the present application can be measured by the following method. The particle diameter of the particulate material in the specification of the present application is defined by a value measured by using a laser diffraction scattering-type particle diameter distribution analyzer (Microtrac3300EXII, manufactured by Nildsdo Co., Ltd.).

In the materials comprising ultrafine cellulose fibers of the present invention, the pH of the following samples is preferably 7 or higher and 11 or lower, and more preferably 8 or higher and 10.5 or lower, but is not especially limited. The samples are samples each prepared by adding the material comprising ultrafine cellulose fibers in pure water so that the solid concentration becomes 0.4% by mass, and stirring the mixture by a disperser under conditions of 1500 rpm and 5 minutes.

By making the pH of the sample 7 or higher, the counter ion of the functional group of the materials comprising ultrafine cellulose fibers become a sodium ion and the ultrafine cellulose fibers electrostatically repel one another, and are easily dispersed in the solvent.

By making the pH of the samples 11 or lower, the alkali concentration in the system is suppressed and the dispersibility of the ultrafine cellulose fibers in the solvent due to the electrostatic repulsive force of the ultrafine cellulose fibers can be improved.

<Redispersion Product of Material Comprising Ultrafine Cellulose Fibers>

The material comprising ultrafine cellulose fibers of the present invention may be re-suspended in a solvent to obtain a redispersion product of ultrafine cellulose fibers.

The type of solvents used for preparingthe material comprising ultrafine cellulose fibers is not particularly limited. Specific examples of solvents include water, organic solvent alone, and a mixture of water and an organic solvent. Examples of the organic solvent include an alcohol, a polyhydric alcohol, a ketone, an ether, dimethylsulfoxide (DMSO), a dimethylformamide (DMF), and a dimethylacetamide (DMAc). Examples of an alcohol include methanol, ethanol, n-propanol, isopropanol, n-butanol, and t-butyl alcohol. Examples of a polyhydric alcohol include ethylene glycol, and glycerin. Examples of a ketone include acetone, and methyl ethyl ketone. Examples of an ether include diethyl ether, tetrahydrofuran, ethylene glycol monomethyl ether, ethylene glycol monoethyl ether, ethylene glycol mono n-butyl ether, and ethylene glycol mono-t-butyl ether. Such an organic solvent may be used alone, or two or more of them may be used. Of the above solvents, a mixture of alcohol and water, a mixture of ether and water, and a mixture of DMSO and water are preferred.

Ultrafine cellulose fibers are redispersed by a usual method. For example, ultrafine cellulose fibers may be redispersed by a step of adding the above solvent to the material comprising ultrafine cellulose fibers of the present invention to prepare a liquid containing ultrafine cellulose fibers and a step of dispersing the ultrafine cellulose fibers in the liquid containing ultrafine cellulose fibers.

When preparing a liquid containing ultrafine cellulose fibers by adding solvent to the material comprising ultrafine cellulose fibers of the present invention, the content of the ultrafine cellulose fibers is preferably 0.1% by mass to 10% by mass based on the entire liquid. The content of the ultrafine cellulose fibers is more preferably 0.2% by mass to 3% by mass based on the liquid containing ultrafine cellulose fibers. A content of 0.1% by mass or more increases the dispersion stability of ultrafine cellulose fibers, and a content of 10% by mass or less prevents the viscosity of ultrafine cellulose fibers from being excessively increased, making handling relatively easy. The content of the ultrafine cellulose fibers may be adjusted by the amount to be added of solvent. The higher the amount to be added of solvent, the lower the content of the ultrafine cellulose fibers.

An apparatus similar to the defibration treatment apparatus described in <Refining treatment of cellulose fibers> above may be used as an apparatus for dispersion used in the step of dispersing ultrafine cellulose fibers.

The redispersion product of ultrafine cellulose fibers obtained as described above has a concentration of ultrafine cellulose fibers of preferably 0.1% by mass or more, more preferably 0.5% by mass or more, even more preferably 1% by mass or more, and still more preferably 3% by mass or more. The upper limit of the concentration of ultrafine cellulose fibers, which is not particularly limited, is usually 10% by mass or less. Adjusting the concentration of ultrafine cellulose fibers to the above range improves handling in coating and provides excellent dispersion stability. The dispersibility may be evaluated by dispersing ultrafine cellulose fibers by, for example, a homo disperser, and visually observing the liquid immediately after that to check the occurrence of precipitation.

<Other Components>

The material comprising ultrafine cellulose fibers of the present invention may contain a surfactant. The surfactant contained decreases surface tension and improves wettability to a step substrate, enabling easy preparation of a sheet containing ultrafine cellulose fibers.

A surfactant such as a nonionic surfactant, an anionic surfactant, and a cationic surfactant may be used. For anionic cellulose, nonionic surfactants and anionic surfactants are preferred. For cationic cellulose, nonionic surfactants and cationic surfactants are preferred.

The material comprising ultrafine cellulose fibers of the present invention may also be prepared by mixing at least one fiber other than the ultrafine cellulose fiber (hereinafter referred to as "additional fiber"). Examples of additional fibers include, but are not limited to, inorganic fibers, organic fibers, synthetic fibers, semi-synthetic fibers, and regenerated fibers. Examples of inorganic fibers include, but are not limited to, glass fibers, rock fibers, and metal fibers. Examples of organic fibers include, but are not limited to, fibers derived from natural products, such as cellulose, carbon fibers, pulp, chitin, and chitosan. Examples of synthetic fibers include, but are not limited to, nylon, vinylon, vinylidene, polyester, polyolefin (e.g., polyethylene, polypropylene), polyurethane, acryl, polyvinyl chloride, and aramid. Examples of semi-synthetic fibers include, but are not limited to, acetate, triacetate, and Promix. Examples of regenerated fibers include, but are not limited to, rayon, cupra, polynosic rayon, lyocell, and tencel. The additional fiber may be subjected to a treatment such as a chemical treatment and a defibration treatment according to need. When the additional fiber is subjected to a treatment such as a chemical treatment and a defibration treatment, the additional fiber may be mixed with ultrafine fiber and then subjected to a treatment such as a chemical treatment and a defibration treatment. Alternatively, the additional fiber may be subjected to a treatment such as a chemical treatment and a defibration treatment, and then mixed with ultrafine fiber. When the additional fiber is mixed with ultrafine fiber, the amount to be added of the additional fiber based on the total amount of the ultrafine fiber and the additional fiber, is not particularly limited, and is preferably 50% by mass or less, more preferably 40% by mass or less, and further preferably 30% by mass or less. The amount to be added is particularly preferably 20% by mass or less.

A hydrophilic polymer may be added to the material comprising ultrafine cellulose fibers of the present invention. The hydrophilic polymer is not particularly limited. Examples thereof include polyethylene glycol, cellulose derivatives (e.g., hydroxyethylcellulose, carboxyethylcellulose, carboxymethylcellulose), casein, dextrin, starch, and modified starch. Examples also include polyvinyl alcohol, modified polyvinyl alcohol (e.g., acetoacetylated polyvinyl alcohol). Other examples include polyethylene oxide, polyvinylpyrrolidone, polyvinyl methyl ether, polyacrylate, polyacrylamide, acrylic acid alkyl ester copolymer, and urethane copolymer.

A hydrophilic low molecular weight compound may also be used instead of the hydrophilic polymer. The hydrophilic low molecular weight compound is not particularly limited. Examples thereof include glycerol, erythritol, xylitol, sorbitol, galactitol, mannitol, ethylene glycol, diethylene glycol, propylene glycol, dipropylene glycol, and butylene glycol. When the hydrophilic polymer or the hydrophilic low molecular weight compound is added, the amount to be added is not particularly limited. The amount is, for example, 1 to 200 parts by mass, preferably 1 to 150 parts by mass, more preferably 2 to 120 parts by mass, and further preferably 3 to 100 parts by mass based on 100 parts by mass of the solid content of ultrafine fiber.

<Applications>

The application of the material comprising ultrafine cellulose fibers of the present invention is not particularly limited. In an example, a redispersion slurry of the ultrafine cellulose fibers is formed into a film, which may be used as various films. In another example, a redispersion slurry of the ultrafine cellulose fibers may be used in various applications (e.g., additives for food, cosmetics, cement, coatings, and ink) as a thickener. Furthermore, the redispersion slurry may be mixed with resin or emulsion to be used as a reinforcing material.

The present invention will be described in more detail by means of the following Examples, but the scope of the present invention is not limited by those Examples.

EXAMPLES

Preparation Example A1

Preparation of Ultrafine Cellulose Fibers (1) Preparation of CNFA1

100 g of urea, 55.3 g of sodium dihydrogen phosphate dihydrate, and 41.3 g of disodium hydrogen phosphate were dissolved in 109 g of water to prepare a phosphorylation reagent.

A formed sheet made of dried needle-leaved tree bleached kraft pulp was treated with a cutter mill and a pin mill to prepare flocculent fibers. 100 g (absolute dry mass) of these flocculent fibers were weighed, and using a spray, the phosphorylation reagent was uniformly sprayed to the fibers. Thereafter, the resulting fibers were kneaded by hands to obtain drug-impregnated pulp.

The obtained drug-impregnated pulp was subjected to a heat treatment for 160 minutes in a damped air drying machine that had been heated to 140° C., so as to obtain phosphorylated pulp.

Thereafter, 100 g (pulp mass) of the obtained phosphorylated pulp was weighed, and 10 L of ion exchange water was then poured therein. The fibers were uniformly dispersed by stirring, and the obtained mixture was then subjected to filtration and dehydration to obtain a dehydration sheet. This step was repeatedly carried out twice. The dehydrated sheet obtained in this step is called dehydrated sheet A.

Next, the dehydrated sheet obtained above was diluted with 10 L of ion exchange water, and a 1N aqueous sodium hydroxide solution was gradually added thereto with stirring to obtain a pulp slurry having a pH of 12 to 13.

Then, the pulp slurry was dehydrated to give a dehydrated sheet, into which 10 L of ion exchange water was poured, and the mixture was stirred and dispersed until homogenous, and filtered and dehydrated to give a dehydrated sheet. This step was repeated twice.

The sheet was diluted with ion exchange water so that the concentration was 0.5% by mass, and then the diluted sheet was subjected to a defibration treatment using a defibration treatment apparatus (made by M Technique Co., Ltd., Clearmix-2.2S) under a condition of 21,500 rpm for 30 minutes to give ultrafine cellulose fiber CNFA1.

Amount of Substituent Introduced

For the above dehydrated sheet A, the amount of the phosphoric acid group introduced was measured by the titration method described below.

[Measurement of Amount of Substituent Introduced (Amount of Phosphoric Acid Group Introduced)]

The amount of the substituent introduced means the amount of the phosphoric acid group introduced into a fiber raw material. The larger the value, the larger the amount of phosphoric acid group introduced into the fiber. The amount of the substituent introduced was measured by diluting the target ultrafine cellulose fiber with ion exchange water so that the content was 0.2% by mass, treating with ion exchange resin, and titrating using alkali. In the treatment with ion exchange resin, a strongly acidic ion exchange resin (AMBERJET 1024, ORGANO CORPORATION, conditioned) was added, at a volume ratio of 1/10, to a slurry containing 0.2% by mass of cellulose fiber, and the mixture was shaken for 1 hour. Then the resultant was poured on a mesh having a mesh size of 90 μm to separate the resin from the slurry. In the titration using alkali, a 0.1 N aqueous sodium hydroxide solution was added to the slurry containing cellulose fiber after the ion exchange to measure a change in values of electric conductivity of the slurry. In other words, the amount of the alkali (mmol) required in the first region in the curve shown in FIG. 1 was divided by the solid content (g) in the slurry, which was the target of titration, to determine the amount of the substituent introduced (mmol/g).

(2) Preparation of CNFA2-CNFA5

CNFA2 was prepared in the same manner as preparing CNFA1 except that the heat treatment conducted for 160 minutes for obtaining phosphorylated pulp was changed to a heat treatment for 120 minutes.

CNFA3 was prepared in the same manner as preparing CNFA1 except that the heat treatment conducted for 160 minutes for obtaining phosphorylated pulp was changed to a heat treatment for 80 minutes.

CNFA4 was prepared in the same manner as preparing CNFA1 except that the heat treatment conducted for 160 minutes for obtaining phosphorylated pulp was changed to a heat treatment for 60 minutes.

CNFA5 was prepared in the same manner as preparing CNFA1 except that the heat treatment conducted for 160 minutes for obtaining phosphorylated pulp was changed to a heat treatment for 40 minutes.

(3) Preparation of CNFA6

Undried needle bleached kraft pulp in an amount equivalent to 200 g on a dry basis, 2.5 g of TEMPO, and 25 g of sodium bromide were dispersed in 1500 ml of water. Then, a 13% by mass aqueous sodium hypochlorite solution was added thereto so that the amount of sodium hypochlorite was 5.0 mmol based on 1.0 g of the pulp to initiate the reaction. The pH was kept at pH 10 to 11 during the reaction by adding a 0.5 M aqueous sodium hydroxide solution, and the reaction was terminated when the pH did not change.

Thereafter, this pulp slurry was dehydrated to obtain a dehydration sheet, and 10 L of ion exchange water was then added thereto. The obtained mixture was uniformly dispersed by stirring, and was then subjected to filtration and dehydration to obtain a dehydration sheet. This step was repeatedly carried out twice.

The sheet was diluted with ion exchange water so that the concentration was 0.5% by mass, and then the diluted sheet was subjected to a defibration treatment using a defibration treatment apparatus (made by M Technique Co., Ltd., Clearmix-2.2S) under a condition of 21,500 rpm for 30 minutes to give ultrafine cellulose fiber CNFA6.

(4) Preparation of CNFA7

CNFA7 was prepared in the same manner as preparing CNFA6 except that a 13% by mass aqueous sodium hypochlorite solution was added to the mixture so that the amount of sodium hypochlorite was 8.0 mmol based on 1.0 g of the pulp to initiate the reaction.

The amounts of the substituents of CNFA1 to CNFA7 are shown in the following table.

TABLE 1

|  | CNFA1 | CNFA2 | CNFA3 | CNFA4 | CNFA5 | CNFA6 | CNFA7 |
|---|---|---|---|---|---|---|---|
| Type of functional group | Phosphoric acid group | Phosphoric acid group | Phosphoric acid group | Phosphoric acid group | Phosphoric acid group | Carboxyl group | Carboxyl group |
| Amount of substituent (mmol/g) | 1.54 | 1.12 | 0.87 | 0.45 | 0.21 | 1 | 1.5 |

<Measurement of Fiber Width>

Fiber widths of CNFA1 to CNFA7 were measured by the following method.

A supernatant of defibrated pulp slurry was diluted with water to a concentration of 0.01% to 0.1% by mass, and the obtained solution was then added dropwise onto a hydrophilized carbon grid film. After drying, it was stained with uranyl acetate, and was then observed under a transmission electron microscope (JEOL-2000EX, manufactured by JEOL). In CNFA1 to CNFA7, it was confirmed that ultrafine cellulose fibers having a width of approximately 4 nm was obtained.

Example A1

CNFA1 was diluted to 0.4% by mass, and 1 g of calcium chloride was added to 100 mL of the diluted solution as a concentrating agent to form a gel. After filtration, the gel was compressed with filter paper to give a concentrate having a solid concentration of 21.4% by mass. The concentrate was immersed in 100 mL of a 0.1 N aqueous hydrochloric acid solution for 30 minutes. Then, 2 g of isopropanol and 2 g of a 6% aqueous sodium hydroxide solution were added thereto, and the mixture was sufficiently mixed with a medicine spoon and then filtered to give a concentrate having a solid concentration of 23.0% by mass. 2 g of isopropanol and 2 g of ion exchange water were added to the concentrate, and the mixture was sufficiently mixed with a medicine spoon and then filtered to give a concentrate having a solid concentration of 26.7%. The resulting concentrate was put in an oven adjusted at 60° C. and heated for 30 minutes. The resulting concentrate had a solid concentration of 80.1% by mass.

The concentrate was added to 100 mL of ion exchange water, and the mixture was stirred at 1,500 rpm for 5 minutes to prepare a 0.4% by mass aqueous solution (also referred to as redispersion).

Examples A2 and A3

The concentrates of Examples A2 and A3 were prepared in the same manner as in Example A1 except that the concentrate was heated for 35 minutes in Example A2 and for 40 minutes in Example A3.

Examples A4 to A9

The concentrates of Examples A4 and A9 were prepared in the same manner as in Example A1 except for using CNFA2 to A7, respectively, instead of CNFA1.

Example A10

CNFA1 was diluted to 0.4% by mass, and 1 g of calcium chloride was added to 100 mL of the diluted solution as a concentrating agent to form a gel. After filtration, the gel was compressed with filter paper to give a concentrate having a solid concentration of 22.4% by mass. The concentrate was immersed in 100 mL of a 0.1 N aqueous hydrochloric acid solution for 30 minutes, then filtered, and the resultant was put in an oven adjusted at 60° C. and heated for 30 minutes. The resulting concentrate had a solid concentration of 82.1% by mass.

Example A11

CNFA1 was diluted to 0.4% by mass, and 1 g of aluminum chloride was added to 100 mL of the diluted solution as a concentrating agent to form a gel. After filtration, the gel was compressed with filter paper to give a concentrate having a solid concentration of 20.1% by mass. 2 g of isopropanol and 2 g of a 6% aqueous sodium hydroxide solution were added thereto, and the mixture was sufficiently mixed with a medicine spoon and then filtered to give a concentrate having a solid concentration of 22.0% by mass. 2 g of isopropanol and 2 g of ion exchange water were added to the concentrate, and the mixture was sufficiently mixed with a medicine spoon and then filtered to give a concentrate having a solid concentration of 26.9%. 2 g of isopropanol was added to the concentrate, and the mixture was sufficiently mixed with a medicine spoon and then filtered to give a concentrate having a solid concentration of 32.4%. The resulting concentrate was put in an oven adjusted at 60° C. and heated for 15 minutes. The resulting concentrate had a solid concentration of 83.2% by mass.

Example A12

CNFA1 was diluted to 0.4% by mass. 200 mL of isopropanol was added to 100 mL of the diluted solution for CNF to gel. The resultant was filtered with filter paper to give filtration residue.

200 mL of isopropanol was added to the filtration residue, and the mixture was stirred for 30 minutes and then filtered with filter paper. Another 200 mL of isopropanol was added to the filtration residue, and the mixture was stirred for 30 minutes and filtered with filter paper to collect filtration residue. The filtration residue was dried in an oven at 60° C. for 30 minutes.

Comparative Example A1

CNFA1 was diluted to 0.4% by mass. 100 mL of the diluted solution was poured into a Petri dish made of Teflon®, and dried in an oven at 60° C. for 120 minutes.

Comparative Example A2

The same procedure as in Comparative Example A1 except that the time of drying was 180 minutes was performed.

Comparative Example A3

CNFA1 was diluted to 0.4% by mass. 100 mL of the diluted solution was frozen using liquid nitrogen, and the resultant was dried using a freeze dryer (Table Top TFD made by Ogawa Seiki Co., Ltd.).

The results of the following measurement and evaluation of the concentrates prepared in respective Examples and Comparative Examples will be shown in Tables below (Measurement of Haze Value)

The concentrate prepared in respective Examples and Comparative Examples was added to 100 mL of ion exchange water, and the mixture was stirred by a disperser (Stirring T. K. Robomix made by Tokushu Kika Kogyo Co., Ltd.) at 1500 rpm for 5 minutes to prepare a 0.4% by mass dispersion (also referred to as redispersion).

The above 0.4% by mass dispersion was put in a glass cell for liquid having an optical path length of 1 cm (made by Fujiwara Scientific Co., Ltd., MG-40, inverse optical path), and the haze of the dispersion was measured in accordance with JIS standard K7136 using a haze meter ("HM-150" made by MURAKAMI COLOR RESEARCH LABORATORY). The zero point was measured with ion exchange water which was put in the glass cell.

(Evaluation of Dispersibility)

The concentrate prepared in respective Examples and Comparative Examples was added to 100 mL of ion exchange water, and the mixture was stirred at 1,500 rpm for 5 minutes to give a 0.4% by mass aqueous solution (also referred to as redispersion).

Hydrophobic titanium oxide (STV-455 available from Titan Kogyo Ltd.) was added in an amount of 1.0% by mass to 100 mL of the above 0.4% by mass aqueous solution, and the mixture was stirred by using a homo mixer at a rotation speed of 4,000 rpm for 5 minutes. The resultant was allowed to stand for 30 minutes, and then observed if hydrophobic titanium oxide was separated from the water layer.

⊙: Hydrophobized titanium oxide is not separated at all, and the mixture remains homogeneous.

○: A little separated hydrophobized titanium oxide exists, but the mixture remains homogeneous as a whole.

x: Hydrophobized titanium oxide particles exist in precipitate or on the surface of water and are separated from a water layer.

(Measurement of Content of NaOH)

The concentrate prepared in respective Examples and Comparative Examples was added to 100 mL of ion exchange water, and the mixture was stirred at 1,500 rpm for 5 minutes to prepare a 0.4% by mass aqueous solution (redispersion). The redispersion obtained was put in a dialysis tube, and the tube was immersed in ion exchange water. Ion exchange water was replaced every other day until the pH did not change. The ion exchange water in which the dialysis tube was immersed was subjected to neutralization titration to measure the content of NaOH in the system.

(Measurement of Content of HCl)

The concentrate prepared in respective Examples and Comparative Examples was put in a dialysis tube, and the tube was immersed in ion exchange water. Ion exchange water was replaced every other day until the pH did not change. The ion exchange water in which the dialysis tube was immersed was subjected to neutralization titration to measure the content of HCl in the system.

(pH of Redispersion)

The concentrate prepared in respective Examples and Comparative Examples was added to 100 mL of ion exchange water, and the mixture was stirred at 1,500 rpm for 5 minutes to prepare a 0.4% by mass aqueous solution (redispersion). The pH of the redispersion obtained was measured by a pH meter (D-71S made by HORIBA, Ltd.).

TABLE 2

|  | Example A1 | Example A2 | Example A3 | Example A4 | Example A5 | Example A6 | Example A7 | Example A8 | Example A9 |
|---|---|---|---|---|---|---|---|---|---|
| Type of ultrafine | CNFA1 | CNFA1 | CNFA1 | CNFA2 | CNFA3 | CNFA4 | CNFA5 | CNFA6 | CNFA7 |

TABLE 2-continued

| | Example A1 | Example A2 | Example A3 | Example A4 | Example A5 | Example A6 | Example A7 | Example A8 | Example A9 |
|---|---|---|---|---|---|---|---|---|---|
| Solid concentration of ultrafine cellulose fibers | 80.1 | 91.2 | 99.5 | 89.7 | 92.8 | 93.6 | 90.7 | 85.6 | 87.3 |
| Dehydration method | Polyvalent metal → acid → isopropyl alcohol/NaOH → isopropyl alcohol/$H_2O$ → oven | | | | | | | | |
| Difference from Example 1 | Solid concentration | | | | Type of CNF | | | | |
| Haze value | 0.5 | 1.8 | 18.6 | 2.3 | 5.6 | 6.1 | 19.3 | 10.2 | 11.1 |
| Evaluation of dispersibility | ⊙ | ⊙ | ⊙ | ⊙ | ⊙ | ○ | ○ | ○ | ○ |
| NaOH content | 0.19 | 0.18 | 0.18 | 0.16 | 0.18 | 0.15 | 0.12 | 0.02 | 0.03 |
| HCl content | 0 | 0 | 0 | 0 | 0 | 0 | 0 | 0 | 0 |
| pH of redispersion | 10.1 | 10.2 | 10 | 9.6 | 9.6 | 8.9 | 8.2 | 7.2 | 7.4 |

Content of NaOH is in % based on mass of ultrafine cellulose fibers.
Content of HCl is in % based on mass of ultrafine cellulose fibers.

TABLE 3

| | Example A10 | Example A11 | Example A12 | Comparative Example A1 | Comparative Example A2 | Comparative Example A3 |
|---|---|---|---|---|---|---|
| Type of ultrafine cellulose fibers | CNFA1 | CNFA1 | CNFA1 | CNFA1 | CNFA1 | CNFA1 |
| Solid concentration of ultrafine cellulose fibers | 82.1 | 83.2 | 82.6 | 90 | 99.4 | 95.6 |
| Dehydration method | Polyvalent metal → acid washing → oven | Polyvalent metal → isopropyl alcohol/NaOH → isopropyl alcohol/$H_2O$ → isopropyl alcohol → oven | Replacing with isopropyl alcohol three times | Drying in oven | Drying in oven | Freeze drying |
| Difference from Example 1 | Dehydration method | | | Dehydration method | | |
| Haze value | 1.2 | 0.9 | 12.9 | 25.9 | 29.5 | 24.6 |
| Evaluation of dispersibility | ⊙ | ⊙ | ○ | X | X | X |
| NaOH content | 0 | 1.9 | 0 | 0 | 0 | 0 |
| HCl content | 0.14 | 0 | 0 | 0 | 0 | 0 |
| pH of redispersion | 9.9 | 10.5 | 11.1 | 10.6 | 10.7 | 10.7 |

Content of NaOH is in % based on mass of ultrafine cellulose fibers.
Content of HCl is in % based on mass of ultrafine cellulose fibers.

Production Example B1

Preparation of CNFB1

First, 100 g of urea, 55.3 g of sodium dihydrogen phosphate dihydrate and 41.3 g of disodium hydrogen phosphate were dissolved in 109 g of water to prepare a phosphorylation reagent.

A sheet obtained by paper made from dried needle bleached kraft pulp was processed with a cutter mill and a pin mill to prepare cotton-like fibers. Then, 100 g by absolute dry mass of the cotton-like fibers were separated, and the phosphorylation reagent was evenly sprayed thereto. Then, the fibers were kneaded by hand to obtain chemical-impregnated pulp.

The obtained chemical-impregnated pulp was heat-treated for 120 minutes in an air-blow dryer with a damper heated to 140° C. to obtain phosphorylated pulp.

Then, 100 g by pulp mass of the obtained phosphorylated pulp was separated, 10 L of ion-exchange water was poured on the pulp, and the mixture was then homogeneously dispersed by stirring, followed by filtration and dehydration to obtain a dehydrated sheet. This step was repeated twice.

The dehydrated sheets obtained here are called dehydrated sheets A.

Subsequently, the obtained dehydrated sheets were diluted with 10 L of ion-exchange water, and a 1 N aqueous sodium hydroxide solution was added thereto little by little with the mixture stirred to obtain pulp slurry having a pH of 12 to 13.

Thereafter, this pulp slurry was dehydrated to obtain a dehydrated sheet, 10 L of ion-exchange water was then poured on the pulp, and the mixture was homogeneously dispersed by stirring, followed by filtration and dehydration to obtain a dehydrated sheet. This step was repeated twice.

Ion-exchange water was added to prepare 2% by mass slurry. This slurry was passed through a single disk refiner the clearance of which was set as 100 μm 3 times to obtain CNF1.

Amount of Substituent Introduced

As to the above-mentioned dehydrated sheet A, the amount of the phosphoric acid group introduced was measured by the same titrating method as the titrating method described in Production Example A1.

Production Example B2 to B8

Preparation of CNFB2 to B8

CNFB2 to B8 were prepared by passing the slurry through the single disk refiner 4 times, 5 times, 6 times, 7 times, 8 times, 9 times and 10 times, respectively, instead of passing the slurry through the single disk refiner 3 times in Production Example B1.

Production Example B9 and B10

Preparation of CNFB9 and B10

CNFB9 and B10 were prepared by changing the time of heat treatment by an air-blow drier from 120 minutes to 80 minutes and passing the slurry through the single disk refiner 5 times and 10 times, respectively, instead of passing the slurry through the single disk refiner 3 times in Production Example B1.

Production Example B11 to B18

Preparation of CNFB11 to B18

CNFB11 was prepared by changing the time of heat treatment by an air-blow drier from 120 minutes to 160 minutes in Production Example B1.

The time of heat treatment by an air-blow drier was changed from 120 minutes to 160 minutes in Production Example 1. The slurry was passed through the single disk refiner 4 times, 5 times, 6 times, 7 times, 8 times, 9 times and 10 times instead of the slurry being passed through the single disk refiner 3 times in Production Example B1. By the above, CNFB12 to CNFB18 were prepared, respectively.

Production Example B19

Preparation of CNFB19

Undried needle bleached kraft pulp equivalent to 200 g by dry mass, 2.5 g of TEMPO and 25 g of sodium bromide were dispersed in 1500 ml of water. Then, a 13% by mass aqueous sodium hypochlorite solution was added thereto such that the amount of sodium hypochlorite was 5.0 mmol on the basis of 1.0 g of pulp, and a reaction was started. A 0.5 M sodium hydroxide solution was dropped during the reaction to maintain the pH at 10 to 11. When any change in the pH was no longer seen, the reaction was ended.

Thereafter, this pulp slurry was dehydrated to obtain a dehydrated sheet, and 10 L of ion-exchange water was then added. Next, the mixture was stirred and dispersed homogeneously, followed by filtration and dehydration to obtain a dehydrated sheet. This step was repeated twice.

Ion-exchange water was added to prepare the 2% by mass slurry. This slurry was passed through the single disk refiner the clearance of which was set as 100 μm 10 times to obtain CNFB19.

Production Example B20

Preparation of CNFB20

CNFB20 was prepared in the same way as in Production Example B19 (the preparation of CNFB19) except that a 13% by mass aqueous sodium hypochlorite solution was added such that the amount of sodium hypochlorite was 8.0 mmol on the basis of 1.0 g of the pulp and the reaction was started.

Production Example B21

Preparation of CNFB21

CNFB21 was prepared by changing the time of heat treatment by the air-blow drier from 120 minutes to 160 minutes in Production Example B1 and passing the slurry through a wet-type micronizing device ("Ultimaizer" manufactured by Sugino Machine Limited) at a pressure of 245 MPa 10 times.

<Measurement of Fiber Width>

The fiber widths of CNFB1 to CNFB21 were measured by the following method.

The supernatant liquids of cellulose suspensions were diluted with water to concentrations of 0.01 to 0.1% by mass and dropped on hydrophilized carbon grid films. The dilutions were dyed with uranyl acetate after drying and observed under the transmission electron microscope (JEOL-2000EX manufactured by JEOL Ltd.).

The supernatant liquids of the cellulose suspensions were diluted with water to concentrations of 0.01 to 0.1% by mass and dropped on slide glasses. Cover glasses were placed thereon, and the diluted supernatant liquid was observed under a digital microscope (KH-7700 manufactured by HIROX Co., Ltd.).

By the above, it was confirmed that ultrafine cellulose fibers having average fiber widths of 1000 nm or less were contained in CNFB1 to CNFB21. Coarse cellulose fibers having average fiber widths of larger than 1 μm and fiber lengths of 10 μm or more were also contained in CNFB1 to 1320.

The amounts of the substituents of CNFB1 to CNFB21 are shown in the following table.

TABLE 4

| | | Type of functional group | Amount of substituent (mmol/g) | Production Method |
|---|---|---|---|---|
| Production Example B1 | CNFB1 | Phosphoric acid group | 1.275 | Passed through refiner 3 times |

TABLE 4-continued

| | Type of functional group | Amount of substituent (mmol/g) | Production Method |
|---|---|---|---|
| Production Example B2 | CNFB2 | | 1.275 | Passed through refiner 4 times |
| Production Example B3 | CNFB3 | | 1.275 | Passed through refiner 5 times |
| Production Example B4 | CNFB4 | | 1.275 | Passed through refiner 6 times |
| Production Example B5 | CNFB5 | | 1.275 | Passed through refiner 7 times |
| Production Example B6 | CNFB6 | | 1.275 | Passed through refiner 8 times |
| Production Example B7 | CNFB7 | | 1.275 | Passed through refiner 9 times |
| Production Example B8 | CNFB8 | | 1.275 | Passed through refiner 10 times |
| Production Example B9 | CNFB9 | | 0.632 | Passed through refiner 5 times |
| Production Example B10 | CNFB10 | | 0.632 | Passed through refiner 10 times |
| Production Example B11 | CNFB11 | | 1.446 | Passed through refiner 3 times |
| Production Example B12 | CNFB12 | | 1.446 | Passed through refiner 4 times |
| Production Example B13 | CNFB13 | | 1.446 | Passed through refiner 5 times |
| Production Example B14 | CNFB14 | | 1.446 | Passed through refiner 6 times |
| Production Example B15 | CNFB15 | | 1.446 | Passed through refiner 7 times |
| Production Example B16 | CNFB16 | | 1.446 | Passed through refiner 8 times |
| Production Example B17 | CNFB17 | | 1.446 | Passed through refiner 9 times |
| Production Example B18 | CNFB18 | | 1.446 | Passed through refiner 10 times |
| Production Example B19 | CNFB19 | Carboxyl group | 1 | Passed through refiner 10 tunes |
| Production Example B20 | CNFB20 | | 1.5 | Passed through refiner 10 times |
| Production Example B21 | CNFB21 | Phosphoric acid group | 1.54 | Passed through Ultimaizer 10 times |

Example B1

CNFB1 was diluted to 0.4% by mass. To 100 mL of the dilution, 1 g of calcium chloride as a concentrating agent was added for gelation. After filtration, the gel was compressed with filter paper to obtain a concentrate having a solid concentration of 21.4% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 23.0% by mass. To the concentrate, 2 g of isopropanol and 2 g of ion-exchange water were added and well mixed therewith using a medicine spoon, and the mixture was then filtered to obtain a concentrate having a solid concentration of 26.7%. The obtained concentrate was placed into the oven set at 60° C. and heated for 30 minutes. The solid concentration of the obtained concentrate was 95% by mass.

Examples B2 to B18

Concentrates were prepared in the same way as in Example B1 except that CNFB2 to B18 were used instead of CNFB1. All the solid concentrations were 95% by mass.

Examples B19 to B22

Concentration operations were conducted in the same way as in Example B1 by using CNFB18 instead of CNFB1 to produce a concentrate having a solid concentration of 22.2% by mass, and aliquots of the concentrate were then heated in the oven set at 60° C., for 0 minutes, 5 minutes, 10 minutes and 15 minutes, respectively. The concentrates of Examples B19 to B22 were prepared in the same way as in Example B1 except the above. The solid concentrations of the concentrates of Examples B19 to B22 were 22.2% by mass, 30.1% by mass, 44.3% by mass and 56.3% by mass, respectively.

Example B23

CNFB18 was diluted to 0.4% by mass. To 100 mL of the dilution, 1 g of calcium chloride as a concentrating agent was added for gelation. After filtration, the gel was compressed with filter paper to obtain a concentrate having a solid concentration of 22.4% by mass. The concentrate was dipped in 100 mL of a 0.1 N aqueous hydrochloric acid solution for 30 minutes and then filtered. The concentrate was placed into the oven set at 60° C. and heated for 30 minutes. The solid concentration of the obtained concentrate was 95% by mass.

Example B24

CNFB18 was diluted to 0.4% by mass. To 100 mL of the dilution, 1 g of aluminium chloride as a concentrating agent was added for gelation. After filtration, the gel was compressed with filter paper to obtain a concentrate having a solid concentration of 20.1% by mass. To the concentrate, 2 g of isopropanol and 2 g of a 6% aqueous sodium hydroxide solution were added and well mixed therewith using a medicine spoon, and the mixture was then filtered to obtain a concentrate having a solid concentration of 22.0% by mass. To the above-mentioned concentrate, 2 g of isopropanol and 2 g of ion-exchange water were added and well mixed therewith using a medicine spoon, and the mixture was then filtered to obtain a concentrate having a solid concentration of 26.9%. To the concentrate, 2 g of isopropanol was added and well mixed therewith using a medicine spoon, and the mixture was then filtered to obtain a concentrate having a solid concentration of 32.4%. The concentrate was placed into the oven set at 60° C. and heated for 15 minutes. The solid concentration of the obtained concentrate was 95% by mass.

Examples B25 and B26

The concentrates of Example B25 and Example B26 were prepared in the same way as in Example B1 except that CNFB19 and CNFB20 were used instead of CNFB1. The solid concentration of the concentrate of Example B25 was 94.3% by mass, and the solid concentration of the concentrate of Example B26 was 93.2% by mass.

Comparative Example B1

CNFB1 was diluted to 0.4% by mass, and 100 mL of the dilution was poured into a petri dish made of Teflon (registered trademark). The petri dish was placed into the oven set at 60° C. and heated for 120 minutes. The solid concentration of the obtained concentrate was 98.7% by mass.

Comparative Example B-2

The operations were conducted in the same way as in Comparative Example B1 except that the heating time was set as 40 minutes. The solid concentration of the obtained concentrate was 24.1% by mass.

Comparative Example B3

The operations were conducted as to CNF21 in the same way as in Comparative Example B1. The solid concentration of the obtained concentrate was 96.2% by mass.

Results obtained by conducting the following measurement and evaluation as to the concentrates prepared in Examples and Comparative Examples were shown in the following Table.

(Measurement of Haze Value)

To 100 mL of ion-exchange water, each of the concentrates prepared in Examples and Comparative Examples was added. The mixture was stirred at 1500 rpm for 5 minutes by a disperser (Stirring TK Robomix manufactured by PRIMIX Corporation) to prepare a 0.4% by mass dispersion (also called a redispersion).

The above-mentioned 0.4% by mass dispersion was placed into a glass cell for liquid having an optical path length of 1 cm (manufactured by Fujiwara Scientific Company Co., Ltd., MG-40, inverse optical path), and the haze of the above-mentioned dispersion was measured using a haze meter ("HM-150" manufactured by MURAKAMI COLOR RESEARCH LABORATORY Co., Ltd.) on the basis of the JIS standard K7136. Zero point measurement was conducted by ion-exchange water placed in the same glass cell.

(Evaluation of Dispersibility)

To 100 mL of ion-exchange water, each of the concentrates prepared in Examples and Comparative Examples was added. The mixture was stirred at 1500 rpm for 5 minutes by the disperser (Stirring TK Robomix manufactured by PRIMIX Corporation) to prepare a 0.4% by mass aqueous solution (also called a redispersion).

After hydrophobized titanium oxide (STV-455 produced by Titan Kogyo, Ltd.) was added in an amount of 1.0% by mass to 100 mL of the above-mentioned 0.4% by mass aqueous solution, the mixture was stirred at a rotation speed of 4,000 rpm for 5 minutes using a homomixer. The mixture was left to stand for 30 minutes, and it was observed whether hydrophobized titanium oxide was separated from a water layer.

⊙: Hydrophobized titanium oxide is not separated at all, and the mixture remains homogeneous.

○: A little separated hydrophobized titanium oxide exists, but the mixture remains homogeneous as a whole.

x: Hydrophobized titanium oxide particles exist in precipitate or on the surface of water and are separated from a water layer.

(Viscosity)

To 100 mL of ion-exchange water, each of the concentrates prepared in Examples and Comparative Examples was added. The mixture was stirred at 1500 rpm for 5 minutes by the disperser (Stirring TK Robomix manufactured by PRIMIX Corporation) to prepare a (14% by mass aqueous solution (also called a redispersion).

As to the above-mentioned 0.4% by mass aqueous solutions, the viscosity was measured at 25° C. at a rotation speed of 3 rpm (3 minutes) using a type B viscometer (manufactured by AMETEK Brookfield, analog viscometer T-LVT).

TABLE 5

| | Type of CNF | Solid concentration (% by mass) | Viscosity (mPa · s) | Haze (%) | Evaluation of dispersibility |
|---|---|---|---|---|---|
| Example B1 | CNFB1 | 95 | 2940 | 36.3 | ○ |
| Example B2 | CNFB2 | 95 | 5544 | 31.9 | ○ |
| Example B3 | CNFB3 | 95 | 8358 | 28.8 | ⊙ |
| Example B4 | CNFB4 | 95 | 10500 | 24.4 | ⊙ |
| Example B5 | CNFB5 | 95 | 12978 | 22.8 | ⊙ |
| Example B6 | CNFB6 | 95 | 14238 | 21.3 | ⊙ |
| Example B7 | CNFB7 | 95 | 15120 | 18.3 | ⊙ |
| Example B8 | CNFB8 | 95 | 13916 | 17.5 | ⊙ |
| Example B9 | CNFB9 | 95 | 6468 | 44.0 | ○ |
| Example B10 | CNFB10 | 95 | 5838 | 43.9 | ○ |
| Example B11 | CNFB11 | 95 | 8400 | 29.0 | ⊙ |
| Example B12 | CNFB12 | 95 | 10920 | 25.8 | ⊙ |
| Example B13 | CNFB13 | 95 | 12180 | 22.5 | ⊙ |
| Example B14 | CNFB14 | 95 | 15540 | 20.6 | ⊙ |
| Example B15 | CNFB15 | 95 | 16800 | 17.8 | ⊙ |
| Example B16 | CNFB16 | 95 | 18900 | 16.3 | ⊙ |
| Example B17 | CNFB17 | 95 | 19950 | 15.4 | ⊙ |
| Example B18 | CNFB18 | 95 | 21000 | 14.4 | ⊙ |
| Example B19 | CNFB18 | 22.2 | 20500 | 16.3 | ⊙ |
| Example B20 | CNFB18 | 30.1 | 21200 | 16.2 | ⊙ |
| Example B21 | CNFB18 | 44.3 | 20400 | 16.9 | ⊙ |
| Example B22 | CNFB18 | 56.3 | 19900 | 18.4 | ⊙ |
| Example B23 | CNFB18 | 95 | 19300 | 19.2 | ⊙ |
| Example B24 | CNFB18 | 95 | 19200 | 18.6 | ⊙ |
| Example B25 | CNFB19 | 94.3 | 16300 | 31.1 | ○ |
| Example B26 | CNFB20 | 93.2 | 18400 | 30.2 | ○ |
| Comparative Example B1 | CNFB1 | 98.7 | 940 | 54.3 | X |
| Comparative Example B2 | CNFB1 | 24.1 | 24800 | 50.1 | X |
| Comparative Example B3 | CNFB21 | 96.2 | 2667 | 20.5 | X |

Production Example C1

Production of Ultrafine Cellulose Fibers (CNF)

(1) Preparation of CNFC1:

First, 100 g of urea, 55.3 g of sodium dihydrogen phosphate dihydrate and 41.3 g of disodium hydrogen phosphate were dissolved in 109 g of water to prepare a phosphorylation reagent.

A sheet obtained by paper made from dried needle bleached kraft pulp was processed with a cutter mill and a pin mill to prepare cotton-like fibers. Then, 100 g by absolute dry mass of the cotton-like fibers was separated, and the phosphorylation reagent was evenly sprayed thereto. Then, the fibers were kneaded by hand to obtain chemical-impregnated pulp.

The obtained chemical-impregnated pulp was heat-treated for 80 minutes in an air-blow dryer with a damper heated to 140° C. to obtain phosphorylated pulp.

Then, 100 g by pulp mass of the obtained phosphorylated pulp was separated, 10 L of ion-exchange water was poured on the pulp, and the mixture was then homogeneously dispersed by stirring, followed by filtration and dehydration to obtain a dehydrated sheet. This step was repeated twice. The dehydrated sheets obtained here are called dehydrated sheets A.

Subsequently, the obtained dehydrated sheets were diluted with 10 L of ion-exchange water, and a 1 N aqueous sodium hydroxide solution was added thereto little by little with the mixture stirred to obtain pulp slurry having a pH of 12 to 13.

Thereafter, this pulp slurry was dehydrated to obtain a dehydrated sheet, 10 L of ion-exchange water was then poured on the pulp, and the mixture was then homogeneously dispersed by stirring, followed by filtration and dehydration to obtain a dehydrated sheet. This step was repeated twice.

Then, 2% shiny was prepared, and the slurry was passed through the wet-type micronizing device ("Ultimaizer" manufactured by Sugino Machine Limited) at a pressure of 245 MPa 10 times to prepare CNFC1.

Amount of Substituent Introduced

As to the above-mentioned dehydrated sheets A, the amount of the phosphoric acid group introduced was measured by the same titrating method as the titrating method described in Production Example A1.

(2) Preparation of CNFC2

CNFC2 was prepared in the same way as in the preparation of CNFC1 except that the obtained chemical-impregnated pulp was heat-treated for 160 minutes instead of the obtained chemical-impregnated pulp being heat-treated for 80 minutes in an air-blow dryer in the preparation of CNFC1.

(3) Preparation of CNFC3

Undried needle bleached kraft pulp equivalent to 200 g by dry mass, 2.5 g of TEMPO and 25 g of sodium bromide were dispersed in 1500 ml of water. Then, a 13% by mass aqueous sodium hypochlorite solution was added thereto such that the amount of sodium hypochlorite was 5.0 mmol on the basis of 1.0 g of pulp, and a reaction was started. A 0.5 M aqueous sodium hydroxide solution was dropped during the reaction to maintain the pH at 10 to 11, and when any change in the pH was no longer seen, the reaction was ended.

Thereafter, this pulp slurry was dehydrated to obtain a dehydrated sheet, and 10 L of ion-exchange water was then added. Next, the mixture was stirred and dispersed homogeneously, followed by filtration and dehydration to obtain a dehydrated sheet. This step was repeated twice.

The obtained dehydrated sheets were diluted with ion-exchange water to a concentration of 0.5% by mass. Then, the dilution was subjected to defibration treatment for 30 minutes under a condition of 21500 rpm using a defibration treatment apparatus (manufactured by M Technique Co., Ltd., Clearmix-2.2S) to obtain CNFC3.

The amounts of the substituents of CNFC1 to CNFC3 are shown in the following Table.

TABLE 6

|  | CNFC1 Phosphoric acid group | CNFC2 Phosphoric acid group | CNFC3 Carboxyl group |
|---|---|---|---|
| Amount of substituent (mmol/g) | 0.87 | 1.54 | 1 |

<Measurement of Fiber Width>

The fiber widths of CNFC1 to CNFC3 were measured by the following method.

The supernatant liquid of the defibrated pulp slurry was diluted with water to a concentration of 0.01 to 0.1% by mass and dropped on a hydrophilized carbon grid film. The dilution was dyed with uranyl acetate after drying and observed under the transmission electron microscope (JEOL-2000EX manufactured by JEOL Ltd.). It was confirmed that CNFC1 to CNFC3 were ultrafine cellulose fibers having widths of around 4 nm.

Example C1

CNFC1 was diluted to 0.4% by mass. To 100 mL of the dilution, 1 g of calcium chloride as a concentrating agent was added for gelation. After filtration, the gel was compressed with filter paper to obtain a concentrate having a solid concentration of 21.4% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 23.0% by mass. To the concentrate, 2 g of isopropanol and 2 g of ion-exchange water were added and well mixed therewith using a medicine spoon, and the mixture was then filtered to obtain a concentrate having a solid concentration of 26.7%. The obtained concentrate was placed into the oven set at 60° C. and heated for 45 minutes. The solid concentration of the obtained concentrate was 98.9% by mass.

The obtained concentrate was processed at 500 rpm for 15 minutes using a PULVERISETTE series planetary ball mill P-6 manufactured by Fritsch Japan Co., Ltd. and balls having a ball diameter of 5 mm to obtain a particulate material.

The particulate material was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution.

Example C2

A particulate material was obtained in the same way as in Example C1 except that the concentrate obtained in Example C1 was processed with a mixer (BM-RE08-HA, manufactured by ZOJIRUSHI CORPORATION) for 1 minute instead of being processed with the ball mill. A 0.4% by mass aqueous solution was prepared in the same way as in Example C1.

Example C3

A particulate material was obtained in the same way as in Example C1 except that CNFC2 was used instead of CNFC1 in Example C1. A 0.4% by mass aqueous solution was prepared in the same way as in Example C1.

Example C4

A particulate material was obtained in the same way as in Example C1 except that CNFC3 was used instead of CNFC1 in Example C1. A 0.4% by mass aqueous solution was prepared in the same way as in Example C1.

Example C5

CNFC1 was diluted to 0.4% by mass. To 100 mL of the dilution, 1 g of calcium chloride as a concentrating agent was added for gelation. After filtration, the gel was compressed with filter paper to obtain a concentrate having a solid concentration of 3.4% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 4.2% by mass. To the concentrate, 2 g of isopropanol and 2 g of ion-exchange water were added and well mixed therewith using a medicine spoon, and the mixture was then filtered to obtain a concentrate having a solid concentration of 5.2%.

The obtained concentrate was processed with the mixer (BM-RE08-HA, manufactured by ZOJIRUSHI CORPORATION) for 1 minute to obtain a particulate material.

The particulate material was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution.

Example C6

The concentrate obtained in Example C5 and having a solid concentration of 5.2% was dried for 10 minutes to obtain a concentrate having a solid concentration of 14.6%. A particulate material and a 0.4% by mass aqueous solution were prepared in the same way as in Example C5.

Example C7

The concentrate obtained in Example C5 and having a solid concentration of 5.2% was dried for 20 minutes to obtain a concentrate having a solid concentration of 26.8%. A particulate material and a 0.4% by mass aqueous solution were prepared in the same way as in Example C5.

Example C8

The concentrate obtained in Example C5 and having a solid concentration of 5.2% was dried for 30 minutes to obtain a concentrate having a solid concentration of 40.1%. A particulate material and a 0.4% by mass aqueous solution were prepared in the same way as in Example C5.

Example C9

The concentrate obtained in Example C5 and having a solid concentration of 5.2% was dried for 35 minutes to obtain a concentrate having a solid concentration of 55.9%. A particulate material and a 0.4% by mass aqueous solution were prepared in the same way as in Example C5.

Example C10

The concentrate obtained in Example C5 and having a solid concentration of 5.2% was dried for 40 minutes to obtain a concentrate having a solid concentration of 72.5%. A particulate material and a 0.4% by mass aqueous solution were prepared in the same way as in Example C5.

Example C11

CNFC1 was diluted to 0.4% by mass. To 100 mL of the dilution, 200 mL of isopropanol was added for gelation. The gel was filtered with filter paper. To the filtered gel, 200 mL of isopropanol was added and mixed therewith. Then, a gel was filtered with filter paper. The filtered gel was compressed with filter paper. The obtained concentrate was placed into the oven set at 60° C. and heated for 45 minutes. The obtained concentrate was processed at 500 rpm for 15 minutes using the PULVERISETTE series planetary ball mill P-6 manufactured by Fritsch Japan Co., Ltd. and balls having a ball diameter of 5 mm to obtain a particulate material.

The particulate material was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution.

Example C12

A particulate material and a 0.4% by mass aqueous solution were prepared in the same way as in Example C11 except that a 2.0% by mass CNF1 dilution was used.

Comparative Example C1

CNFC1 was diluted to 0.4% by mass. To 100 mL of the dilution, 1 g of calcium chloride as a concentrating agent was added for gelation. After filtration, the gel was compressed with filter paper to obtain a concentrate having a solid concentration of 21.4% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 23.0% by mass. To the concentrate, 2 g of isopropanol and 2 g of ion-exchange water were added and well mixed therewith using a medicine spoon, and the mixture was then filtered to obtain a concentrate having a solid concentration of 26.7%. The obtained concentrate was placed into the oven set at 60° C. and heated for 45 minutes. The solid concentration of the obtained concentrate was 98.9% by mass.

The concentrate was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution.

Comparative Example C2

CNFC1 was diluted to 0.4% by mass, and 100 mL of the dilution was placed into a Teflon (registered trademark) petri dish. The dilution was dried to absolute dry condition in the oven at 60° C.

The obtained concentrate was processed at 500 rpm for 15 minutes using the PULVERISETTE series planetary ball mill P-6 manufactured by Fritsch Japan Co., Ltd. and balls having a ball diameter of 5 mm to obtain a particulate material.

The particulate material was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution.

Results obtained by conducting the following measurement and evaluation as to the concentrates prepared in Examples and Comparative Examples are shown in the following Table.

(Measurement of Cumulative Median Diameter)

The particle diameters of the particulate materials were measured using a laser diffraction scattering particle diameter distribution measuring apparatus Microtrac 3300EXII (manufactured by NIKKISO CO., LTD.). The total volume of each of the particulate materials was considered as 100%, and the cumulative curve was determined. The cumulative median diameter (μm) was determined by calculating the particle diameter of a point at which the cumulative curve was 50%.

(Measurement of Volume Average Diameter)

The volume average diameters (μm) were determined by conducting measurement using the laser diffraction scattering particle diameter distribution measuring apparatus Microtrac 3300EXII (manufactured by NIKKISO CO., LTD.).

(Measurement of Number Average Diameter)

The number average diameters (μm) were determined by conducting measurement using the laser diffraction scattering particle diameter distribution measuring apparatus Microtrac 3300EXII (manufactured by NIKKISO CO., LTD.).

(Measurement of Area Average Diameter)

The area average diameters (μm) were determined by conducting measurement using the laser diffraction scattering particle diameter distribution measuring apparatus Microtrac 3300EXII (manufactured by NIKKISO CO., LTD.).

(Measurement of Specific Surface Area)

The specific surface areas were determined by conducting measurement using the laser diffraction scattering particle diameter distribution measuring apparatus Microtrac 3300EXII (manufactured by NIKKISO CO., LTD.).

(Measurement of Bulk Density)

The bulk densities of the particulate materials obtained in Example and Comparative Example were measured using an angle of repose tester (AS ONE Corporation). First, 100 ml of each of the particulate materials was placed into the chute of the angle of repose tester and the chute gate was opened to drop the particulate material downward to fill a container (full volume V=50 ml) placed on the bottom to form a heap. Then the heap is leveled off to fill the space just full. The mass of the particulate material remaining in the container was weighed, and the bulk density (g/ml) was calculated by the following expression.

Bulk Density (g/ml)=Mass (g) of Powder/Volume (ml) of Powder (Measurement of Angle of Repose)

The angles of repose of the particulate materials obtained by Examples and Comparative Examples were measured using the angle of repose tester (AS ONE Corporation). First, 100 ml of each of the particulate materials was placed into the chute of the angle of repose tester and the chute gate was opened to drop the particulate material downward. The angle formed by the slope of the dropped particulate material and the horizontal plane was measured and defined as an angle of repose.

(Measurement of the Haze Value)

Each of the concentrates prepared in Examples and Comparative Examples were added to 100 mL of ion-exchange water, and the mixture was stirred at 1500 rpm for 5 minutes by the disperser (Stirring TK Robomix manufactured by PRIMIX Corporation) to prepare a 0.4% by mass dispersion (also called a redispersion).

The above-mentioned 0.4% by mass dispersion was placed into the glass cell for liquid having an optical path length of 1 cm (manufactured by Fujiwara Scientific Company Co., Ltd., MG-40, inverse optical path), and the haze of the above-mentioned dispersion was measured using a hazemeter ("HM-150" by MURAKAMI COLOR RESEARCH LABORATORY Co., Ltd.) on the basis of the JIS standard K7136. Zero point measurement was conducted by ion-exchange water placed in the glass cell.

(Evaluation of Dispersibility)

Each of the concentrates prepared in Examples and Comparative Examples was added to 100 mL of ion-exchange water, and the mixture was stirred at 1500 rpm for 30 seconds by the disperser (Stirring TK Robomix manufactured by PRIMIX Corporation) to prepare a 0.4% by mass aqueous solution (also called a redispersion).

After hydrophobized titanium oxide (STV-455 produced by Titan Kogyo, Ltd.) was added in amount of 1.0% by mass to 100 mL of the above-mentioned 0.4% by mass aqueous solution, and the mixture was stirred sufficiently for 1 minute using a medicine spoon. The mixture was left to stand for 30 minutes, and it was observed whether hydrophobized titanium oxide was separated from a water layer.

⊙: Hydrophobized titanium oxide remains stable in the aqueous solution without separation or sedimentation at all.

○: A little separated or sedimented hydrophobized titanium oxide exists, but the mixture remains homogeneous as a whole.

x: Hydrophobized titanium oxide particles exist in precipitate or on the surface of water and are separated from a water layer.

TABLE 7

| | Example C1 | Example C2 | Example C3 | Example C4 | Example C5 | Example C6 | Example C7 | Example C8 | Example C9 | Example C10 |
|---|---|---|---|---|---|---|---|---|---|---|
| CNF | CNFC1 | CNFC1 | CNFC2 | CNFC3 | CNFC1 | CNFC1 | CNFC1 | CNFC1 | CNFC1 | CNFC1 |
| CNF Solid concentration | 98.9 | 98.6 | 99.1 | 99 | 5.2 | 14.6 | 26.8 | 40.1 | 55.9 | 72.5 |
| Dehydration method | Polyvalent metal → acid → IPA/NaOH → IPA/H2O → oven → crushing | | | | | | | | | |
| Difference from Example 1 | | Mixer | Type of CNF (amount of phosphoric acid group) | Type of CNF (carboxyl group) | Degree of concentration (CNF content) | | | | | |
| Haze value | 12.1 | 18.6 | 0.9 | 12.1 | 0.9 | 1.2 | 1.5 | 4.6 | 8.2 | 9.7 |
| Cumulative median diameter (μm) | 92.1 | 546.2 | 55.3 | 90.1 | 1009.3 | 849.1 | 874.2 | 759.2 | 700.9 | 723.1 |
| Volume average diameter (μm) | 102.93 | 610.40 | 61.80 | 100.69 | 1127.93 | 948.90 | 976.96 | 848.44 | 783.29 | 808.09 |

TABLE 7-continued

|  | Example C1 | Example C2 | Example C3 | Example C4 | Example C5 | Example C6 | Example C7 | Example C8 | Example C9 | Example C10 |
|---|---|---|---|---|---|---|---|---|---|---|
| Number average diameter (μm) | 24.05 | 142.64 | 14.44 | 23.53 | 263.58 | 221.74 | 228.30 | 198.26 | 183.04 | 188.84 |
| Area average diameter (μm) | 67.42 | 399.86 | 40.48 | 65.96 | 738.89 | 621.61 | 639.99 | 555.80 | 513.12 | 529.37 |
| Specific surface area (m2/cm3) | 0.0890 | 0.0150 | 0.1482 | 0.0910 | 0.0081 | 0.0097 | 0.0094 | 0.0108 | 0.0117 | 0.0113 |
| Angle of repose (°) | 17 | 33 | 20 | 25 | 49 | 45 | 40 | 38 | 35 | 32 |
| Bulk density (g/mL) | 0.15 | 0.10 | 0.18 | 0.18 | 0.49 | 0.41 | 037 | 0.37 | 0.38 | 0.36 |
| Evaluation of dispersibility | ⊙ | ○ | ⊙ | ⊙ | ○ | ○ | ○ | ○ | ○ | ○ |

TABLE 8

|  | Example C11 | Example C12 | Comparative Example C1 | Comparative Example C2 |
|---|---|---|---|---|
| CNF | CNFC1 | CNFC1 | CNFC1 | CNFC1 |
| CNF Solid concentration | 99.2 | 98.8 | 99.7 | 99.8 |
| Dehydration method | IPA → IPA → oven → crushing | | Without crushing | Oven-drying → mixer |
| Difference from Example 1 | Concentration in initial stage of dehydration and mixer | Concentration in initial stage of dehydration and mixer | Not particulate but large lumps | Drying method |
| Haze value | 2.5 | 4.8 | 13.4 | 22.2 |
| Cumulative median diameter (μm) | 173.3 | 945.1 | Impossible to measure | 1254.2 |
| Volume average diameter (μm) | 193.67 | 884.13 | Impossible to measure | 1401.62 |
| Number average diameter (μm) | 45.257 | 400.99 | Impossible to measure | 532.14 |
| Area average diameter (μm) | 126.87 | 706.76 | Impossible to measure | 918.18 |
| Specific surface area (m2/cm3) | 0.0473 | 0.0085 | Impossible to measure | 0.0040 |
| Angle of repose (°) | 15 | 30 | Impossible to measure | 53 |
| Bulk density (g/mL) | 0.21 | 0.34 | 0.55 | 0.60 |
| Evaluation of dispersibility | ⊙ | ⊙ | X | X |

Production Example D1

Production of Ultrafine Cellulose Fibers (1) Production of CNFD1

First, 100 g of urea, 55.3 g of sodium dihydrogen phosphate dihydrate and 41.3 g of disodium hydrogen phosphate were dissolved in 109 g of water to prepare a phosphorylation reagent.

A sheet obtained by paper made from dried needle bleached kraft pulp was processed with a cutter mill and a pin mill to prepare cotton-like fibers. Then, 100 g by absolute dry mass of the cotton-like fibers was separated, and the phosphorylation reagent was evenly sprayed thereto. Then, the fibers were kneaded by hand to obtain chemical-impregnated pulp.

The obtained chemical-impregnated pulp was heat-treated for 80 minutes in an air-blow dryer with a damper heated to 140° C. to obtain phosphorylated pulp.

Then, 100 g by pulp mass of the obtained phosphorylated pulp was separated, 10 L of ion-exchange water was poured on the pulp, and the mixture was then homogeneously dispersed by stirring, followed by filtration and dehydration to obtain a dehydrated sheet. This step was repeated twice. The dehydrated sheets obtained here are called dehydrated sheets A.

Subsequently, the obtained dehydrated sheets were diluted with 10 L of ion-exchange water, and a 1 N aqueous sodium hydroxide solution was added thereto little by little with the mixture stirred to obtain pulp slurry having a pH of 12 to 13.

Thereafter, this pulp slurry was dehydrated to obtain a dehydrated sheet, 10 L of ion-exchange water was then poured on the pulp, and the mixture was then homogeneously dispersed by stirring, followed by filtration and dehydration to obtain a dehydrated sheet. This step was repeated twice.

Then, 2% slurry was prepared, and the slurry was passed through the wet-type micronizing device ("Ultimaizer" manufactured by Sugino Machine Limited) at a pressure of 245 MPa 10 times to prepare CNFD1.

Amount of Substituent Introduced

As to the above-mentioned dehydrated sheets A, the amount of the phosphoric acid group introduced was measured by the same titrating method as the titrating method described in Production Example A1.

(2) Preparation of CNFD2

CNFD2 was prepared in the same way as the preparation of CNFD1 except that 80 minutes of heat treatment at the time of obtaining phosphorylated pulp was changed to 160 minutes of heat treatment.

(3) Preparation of CNFD3

Undried needle bleached kraft pulp equivalent to 200 g by dry mass, 2.5 g of TEMPO and 25 g of sodium bromide were dispersed in 1500 ml of water. Then, 13% by mass sodium hypochlorite solution was added such that the amount of sodium hypochlorite was 5.0 mmol on the basis of 1.0 g of pulp, and the reaction was started. A 0.5 M sodium hydroxide solution was dropped during the reaction to maintain the pH at 10 to 11, and when any change in the pH was no longer seen, the reaction was ended.

Thereafter, this pulp slurry was dehydrated to obtain a dehydrated sheet, and 10 L of ion-exchange water was then added. Next, the mixture was stirred and dispersed homogeneously, followed by filtration and dehydration to obtain a dehydrated sheet. This step was repeated twice.

The obtained dehydrated sheets were diluted with ion-exchange water to a concentration of 0.5% by mass. Then, the dilution was subjected to defibration treatment for 30 minutes under a condition of 21500 rpm using the defibration treatment apparatus (manufactured by M Technique Co., Ltd., Clearmix-2.2S) to obtain CNFD3.

The amounts of the substituents of CNFD1 to CNFD3 are shown in the following Table.

TABLE 9

| | CNFD1 Phosphoric acid group | CNFD2 Phosphoric acid group | CNFD3 Carboxyl group |
|---|---|---|---|
| Amount of substituent (mmol/g) | 0.87 | 1.54 | 1 |

<Measurement of Fiber Width>

The fiber widths of CNFD1 to CNFD3 were measured by the following method.

The supernatant liquid of defibrated pulp slurry was diluted with water to a concentration of 0.01 to 0.1% by mass and dropped on a hydrophilized carbon grid film. The dilution was dyed with uranyl acetate after drying and observed under the transmission electron microscope (JEOL-2000EX manufactured by JEOL Ltd.). It was confirmed that CNFD1 to CNFD3 were ultrafine cellulose fibers having widths of around 4 nm.

Example D1

CNFD1 was diluted to 0.4% by mass. To 100 mL of the dilution, 1 g of calcium chloride as a concentrating agent was added for gelation. After filtration, the gel was compressed with filter paper to obtain a concentrate having a solid concentration of 3.4% by mass. The concentrate was dipped in 100 mL of a 0.1 N aqueous hydrochloric acid solution for 30 minutes. To the concentrate, 2 g of isopropanol (IPA) and 2 g of a 6% aqueous sodium hydroxide solution were then added and well mixed therewith using a medicine spoon, and the mixture was then filtered to obtain a concentrate having a solid concentration of 4.2% by mass. To the concentrate, 2 g of isopropanol and 2 g of ion-exchange water were added and well mixed therewith using a medicine spoon, and the mixture was then filtered to obtain a concentrate having a solid concentration of 5.1%.

To 100 mL of ion-exchange-water, the above-mentioned concentrate was added and stirred at 1500 rpm for 5 minutes to prepare a 0.4% by mass aqueous solution.

Example D2

The concentrate having a solid concentration of 5.1% obtained in Example D1 was placed into the oven set at 60° C. and heated for 30 minutes. The solid concentration of the obtained concentrate was 18.6% by mass.

Example D3 to D7

The concentrates of Example D3 to D7 were obtained in the same way as in Example D2 except that the heating time in Example D2 was changed to 40 minutes, 50 minutes, 60 minutes, 70 minutes and 80 minutes, respectively. The solid concentrations of the obtained concentrates are as described in the following Table.

Example D8

A concentrate was obtained in the same way as in Example D2 except that CNFD2 was used instead of CNFD1 and the heating time in Example D2 was changed to 80 minutes. The solid concentration of the obtained concentrate is as described in the following Table.

Example D9

A concentrate was obtained in the same way as in Example D2 except that CNFD3 was used instead of CNFD1 and the heating time in Example D2 was changed to 80 minutes. The solid concentration of the obtained concentrate is as described in the following Table.

Example D10

CNFD1 was diluted to 0.4% by mass. To 100 mL of the dilution, 1 g of calcium chloride as a concentrating agent was added for gelation. After filtration, the gel was compressed with filter paper to obtain a concentrate having a solid concentration of 3.4% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 4.2% by mass. To the concentrate, 2 g of isopropanol and 2 g of ion-exchange water were added and well mixed therewith using a medicine spoon, and the mixture was then filtered to obtain a concentrate having a solid concentration of 5.1%. Additionally, to the concentrate, 2 g of isopropanol and 2 g of ion-exchange water were added and well mixed therewith using a medicine spoon, and the mixture was then filtered to obtain a concentrate having a solid concentration of 6.2%. The obtained concentrate was placed into the oven set at 60° C. and heated for 40 minutes. The solid concentration of the obtained concentrate was 35.2% by mass.

Comparative Example D1

CNFD1 was diluted to 0.4% by mass, and 100 mL of the dilution was poured into a Teflon (registered trademark) petri dish. The dilution was placed in the oven set at 60° C. and heated for 120 minutes. The solid concentration of the obtained concentrate was 97.3% by mass.

Comparative Example D2

CNFD1 was diluted to 0.4% by mass. To 100 mL of the dilution, 1 g of calcium chloride as a concentrating agent was added for gelation. After filtration, the gel was compressed with filter paper to obtain a concentrate having a solid concentration of 1.1% by mass. The concentrate was dipped in 100 mL of a 0.1 N aqueous hydrochloric acid solution for 30 minutes. To the concentrate, 2 g of isopropanol and 2 g of a 6% aqueous sodium hydroxide solution were then added and well mixed therewith using a medicine spoon, and the mixture was then filtered to obtain a concentrate having a solid concentration of 2.1% by mass. To the concentrate, 2 g of isopropanol and 2 g of ion-exchange water were added and well mixed therewith using a medicine spoon, and the mixture was then filtered to obtain a concentrate having a solid concentration of 2.6%.

Results obtained by conducting the following measurement and evaluation as to the concentrates prepared in Examples and Comparative Examples are shown in the following Table.

(Measurement of Content of Nondispersive Component)

A cellulose concentrate is added to ion-exchange water to obtain a dispersion having a solid concentration of 0.2% by mass. Subsequently, the above-mentioned dispersion is centrifuged under conditions of 12000 G and 10 minutes by a high-speed refrigerated centrifuge. The solid concentration C of the supernatant liquid obtained thereby is measured. The content percentage of nondispersive components is calculated from the following expression.

[Content Percentage (%) of Nondispersive Components]=100−(C/0.2)×100

(Evaluation of Dispersibility)

To 100 mL of ion-exchange water, each of the concentrates prepared in Examples and Comparative Examples was added. The mixture was stirred at 1500 rpm for 5 minutes to prepare a 0.4% by mass aqueous solution (also called redispersion).

After hydrophobized titanium oxide (STV-455 produced by Titan Kogyo, Ltd.) was added in an amount of 1.0% by mass to 100 mL of the above-mentioned 0.4% by mass aqueous solution, the mixture was stirred at a rotation speed of 4,000 rpm for 5 minutes using the homomixer. The mixture was left to stand for 30 minutes, and it was observed whether hydrophobized titanium oxide was separated from a water layer.

⊙: Hydrophobized titanium oxide is not separated at all, and the mixture remains homogeneous.

◯: A little separated hydrophobized titanium oxide exists, but the mixture remains homogeneous as a whole.

x: Hydrophobized titanium oxide particles exist in precipitate or on the surface of water and are separated from a water layer.

TABLE 10

| | Example D1 | Example D2 | Example D3 | Example D4 | Example D5 | Example D6 | Example D7 |
|---|---|---|---|---|---|---|---|
| CNF | CNFD1 | CNFD1 | CNFD1 | CNFD1 | CNFD1 | CNFD1 | CNFD1 |
| Amount of CNF solid | 5.1 | 18.6 | 34.5 | 50.3 | 70.4 | 90.2 | 99.3 |
| Dehydration method | Polyvalent metal → acid → IPA/NaOH → IPA/H2O → oven | | | | | | |
| Difference from Example 3 | Degree of concentration | Degree of concentration | | Degree of concentration | Degree of concentration | Degree of concentration | Degree of concentration |
| Nondispersive component content | 5.4 | 6.3 | 9.8 | 11.1 | 10.1 | 15.3 | 18.4 |
| Evaluation | ⊙ | ⊙ | ⊙ | ⊙ | ⊙ | ◯ | ◯ |

TABLE 11

| | Example D8 | Example D9 | Example D10 | Comparative Example D1 | Comparative Example D2 |
|---|---|---|---|---|---|
| CNF | CNFD2 | CNFD3 | CNFD1 | CNFD1 | CNFD1 |
| Amount of CNF solid | 94.3 | 93.2 | 35.2 | 97.3 | 2.6 |
| Dehydration method | Polyvalent metal → acid → IPA/NaOH → IPA/H2O → oven | | Polyvalent metal → acid → IPA/NaOH → IPA/H2O × 2 → oven | Drying in oven | Polyvalent metal → acid → IPA/NaOH → IPA/H2O |
| Difference from Example 3 | Type of CNF | Type of CNF | Concentration method | | |

TABLE 11-continued

|  | Example D8 | Example D9 | Example D10 | Comparative Example D1 | Comparative Example D2 |
|---|---|---|---|---|---|
| Nondispersive component content | 12.7 | 14.3 | 3.4 | 23.2 | 40.3 |
| Evaluation | ⊙ | ⊙ | ○ | X | X |

Production Example E1

Production of Ultrafine Cellulose Fiber (CNF)

First, 100 g of urea, 55.3 g of sodium dihydrogen phosphate dihydrate and 41.3 g of disodium hydrogen phosphate were dissolved in 109 g of water to prepare a phosphorylation reagent.

A sheet obtained by paper made from dried needle bleached kraft pulp was processed with a cutter mill and a pin mill to prepare cotton-like fibers. Then, 100 g by absolute dry mass of the cotton-like fibers was separated, and the phosphorylation reagent was evenly sprayed thereto. Then, the fibers were kneaded by hand to obtain chemical-impregnated pulp.

The obtained chemical-impregnated pulp was heat-treated for 160 minutes in an air-blow dryer with a damper heated to 140° C. to obtain phosphorylated pulp.

Then, 100 g by pulp mass of the obtained phosphorylated pulp was separated, 10 L of ion-exchange water was poured on the pulp, and the mixture was then homogeneously dispersed by stirring, followed by filtration and dehydration to obtain a dehydrated sheet. This step was repeated twice. The dehydrated sheets obtained here are called dehydrated sheets A.

Subsequently, the obtained dehydrated sheets were diluted with 10 L of ion-exchange water, and a 1 N aqueous sodium hydroxide solution was added thereto little by little with the mixture stirred to obtain pulp slurry having a pH of 12 to 13.

Thereafter, this pulp slurry was dehydrated to obtain a dehydrated sheet, 10 L of ion-exchange water was then poured on the pulp, and the mixture was then homogeneously dispersed by stirring, followed by filtration and dehydration to obtain a dehydrated sheet. This step was repeated twice.

The obtained dehydrated sheets were diluted with ion-exchange water to a concentration of 0.5% by mass. Then, the dilution was subjected to defibration treatment for 30 minutes under a condition of 21500 rpm using the defibration treatment apparatus (manufactured by M Technique Co., Ltd., Cleannix-2.2S) to obtain CNFE1, which is ultrafine cellulose fibers.

Amount of Substituent Introduced

As to the above-mentioned dehydrated sheets A, the amount of the phosphoric acid group introduced was measured by the same titrating method as the titrating method described in Production Example A1.

The amount of the phosphoric acid group introduced was 1.54 mmol/g.

<Measurement of Fiber Width>

The fiber width of CNFE1 was measured by the following method.

The supernatant liquid of the defibrated pulp slurry was diluted with water to a concentration of 0.01 to 0.1% by mass and dropped on a hydrophilized carbon grid film. The dilution was dyed with uranyl acetate after drying and observed under the transmission electron microscope (JEOL-2000EX manufactured by JEOL Ltd.). It was confirmed that CNFE1 was ultrafine cellulose fibers having widths of around 4 nm.

Example E1

CNFE1 was diluted to 0.4% by mass. To 100 mL of the dilution, 200 mL of isopropanol (IPA) was added for the gelation of CNFE1. The gel was filtered and compressed with filter paper for 2 minutes to obtain a concentrate. The obtained concentrate was processed for 1 minute by the mixer (BM-RE08-HA, manufactured by ZOJIRUSHI CORPORATION) and crushed.

Example E2

CNFE1 was diluted to 0.4% by mass. To 100 mL of the dilution, 100 mL of isopropanol was added for the gelation of CNFEL The gel was filtered and compressed with filter paper for 2 minutes to obtain a concentrate. The obtained concentrate was processed for 1 minute by the mixer (BM-RE08-HA, manufactured by ZOJIRUSHI CORPORATION) and crushed.

Example E3

A concentrate was obtained and crushed in the same way as in Example E1 1 except that 2000 mL of isopropanol was added.

Example E4

A concentrate was obtained and crushed in the same way as in Example E1 except that 5000 mL of isopropanol was added.

Example E5

A concentrate was obtained and crushed in the same way as in Example E1 except that 10000 mL of isopropanol was added.

Example E6

CNFE1 was diluted to 0.4% by mass. To 100 mL of the dilution, 200 mL of isopropanol (IPA) was added for the gelation of CNFE1. The gel was filtered to obtain a concentrate. The obtained concentrate was processed for 1 minute by the mixer (BM-RE08-HA, manufactured by ZOJIRUSHI CORPORATION) and crushed.

Example E7

A concentrate was obtained and crushed in the same way as in Example E1 except that the compression time was set as 1 minute.

Example E8

CNFE1 was diluted to 0.4% by mass. To 100 mL of the dilution, 200 mL of isopropanol was added for the gelation of CNFE1. The gel was filtered with filter paper. The filtered gel was dried at 60° C. for 20 minutes to obtain CNF having a high solid content. The obtained concentrate was processed for 1 minute by the mixer (BM-RE08-HA, manufactured by ZOJIRUSHI CORPORATION) and crushed.

Example E9

CNFE1 was diluted to 0.4% by mass. To 100 mL of the dilution, 200 mL of isopropanol was added for the gelation of CNFE1. The gel was filtered with filter paper. The filtered gel was dried at 60° C. for 30 minutes to obtain CNFE1 having a high solid content. The obtained concentrate was processed for 1 minute by the mixer (BM-RE08-HA, manufactured by ZOJIRUSHI CORPORATION) and crushed.

Example E10

CNFE1 was diluted to 0.4% by mass. To 100 mL of the dilution, 200 mL of isopropanol was added for the gelation of CNF. The gel was filtered with filter paper. The filtered gel was dried at 60° C. for 60 minutes to obtain CNFE1 having a high solid content. The obtained concentrate was processed for 1 minute by the mixer (BM-RE08-HA, manufactured by ZOJIRUSHI CORPORATION) and crushed.

Example E11

CNFE1 was diluted to 0.4% by mass. To 100 mL of the dilution, 5000 mL of isopropanol was added for the gelation of CNFE1. The gel was filtered with filter paper. The filtered gel was dried at 60° C. for 60 minutes to obtain CNF having a high solid content. The obtained concentrate was processed for 1 minute by the mixer (BM-RE08-HA, manufactured by ZOJIRUSHI CORPORATION) and crushed.

Comparative Example E1

CNFE1 was diluted to 0.4% by mass. After 80 mL of isopropanol was added to 100 mL of the dilution, the gel was dried at 60° C. for 60 minutes to obtain 22.2% CNFEL The obtained concentrate was processed for 1 minute by the mixer (BM-RE08-HA, manufactured by ZOJIRUSHI CORPORATION) and crushed.

Comparative Example E2

CNFE1 was diluted to 0.4% by mass. To 100 mL of the dilution, 20000 mL of isopropanol was added for the gelation of CNFE1. The gel was filtered with filter paper and compressed with filter paper for 2 minutes to obtain a concentrate. The obtained concentrate was processed for 1 minute by the mixer (BM-RE08-HA, manufactured by ZOJIRUSHI CORPORATION) and crushed.

Results obtained by conducting the following measurement and evaluation as to the concentrates prepared in Examples and Comparative Examples are shown in the following Table.

(Measurement of Haze Value)

Each of the concentrates prepared in Examples and Comparative Examples was added to 100 mL of ion-exchange water, and the mixture was stirred at 1500 rpm for 5 minutes by the disperser (Stirring TK Robomix manufactured by PRIMIX Corporation) to prepare a 0.4% by mass aqueous solution (also called a redispersion).

The above-mentioned 0.4% by mass dispersion was placed into the glass cell for liquid having an optical path length of 1 cm (manufactured by Fujiwara Scientific Company Co., Ltd., MG-40, inverse optical path), and the haze of the above-mentioned dispersion was measured using the hazemeter ("HM-150" manufactured by MURAKAMI COLOR RESEARCH LABORATORY Co., Ltd.) on the basis of the JIS standard K7136. Zero point measurement was conducted by ion-exchange water placed in the glass cell.

(Evaluation of Dispersibility)

Each of the concentrates prepared in Examples and Comparative Examples was added to 100 mL of ion-exchange water, and the mixture was stirred at 1500 rpm for 5 minutes to prepare a 0.4% by mass aqueous solution (also called a redispersion).

After hydrophobized titanium oxide (STV-455 produced by Titan Kogyo, Ltd.) was added in an amount of 1.0% by mass to 100 mL of the above-mentioned 0.4% by mass aqueous solution, and the mixture was stirred at a rotation speed of 4,000 rpm for 5 minutes using the homomixer. The mixture was left to stand for 30 minutes, and it was observed whether hydrophobized titanium oxide was separated from a water layer.

Excellent: Hydrophobized titanium oxide is not separated at all, and the mixture remains homogeneous.

Good: A little separated hydrophobized titanium oxide exists, but the mixture remains homogeneous as a whole.

Poor: Hydrophobized titanium oxide particles exist in precipitate or on the surface of water and are separated from a water layer.

TABLE 12

| | Example E1 | Example E2 | Example E3 | Example E4 | Example E5 |
|---|---|---|---|---|---|
| CNF Solid concentration | 25.6 | 24.7 | 25.1 | 25.9 | 26.1 |
| Difference from Example 1 | | | Ratio of IPA | | |
| Ratio of organic solvent to water | 2 | 1 | 20 | 50 | 100 |
| Dehydration method | | | IPA | | |
| Haze value | 2.5 | 4.8 | 4.7 | 13.4 | 14.2 |
| Evaluation | ⊙ | ⊙ | ⊙ | ○ | ○ |

TABLE 13

|  | Example E6 | Example E7 | Example E8 | Example E9 | Example E10 | Example E11 | Comparative Example E1 | Comparative Example E2 |
|---|---|---|---|---|---|---|---|---|
| CNF Solid concentration | 5.3 | 15.6 | 40.5 | 60.5 | 95.2 | 97.3 | 22.2 | 30.2 |
| Difference from Example 1 | Degree of concentration | | | | | Degree of concentration and ratio of IPA | Ratio of IPA | Ratio of IPA |
| Ratio of organic solvent to water | 2 | 2 | 2 | 2 | 2 | 50 | 0.8 | 200 |
| Dehydration method | IPA | | IPA → oven | | | | IPA addition → oven | IPA |
| Haze value | 15.2 | 16.3 | 9.4 | 8.2 | 18.3 | 19.2 | 26.3 | 23.4 |
| Evaluation | ○ | ○ | ⊙ | ⊙ | ⊙ | ○ | X | X |

The invention claimed is:

1. A material comprising ultrafine cellulose fibers and water, wherein a content of the ultrafine cellulose fibers is 82.1% by mass or more, and when a sample of the material comprising ultrafine cellulose fibers is added to water to a solid concentration of 0.4% by mass, and the resulting mixture is stirred with a disperser under conditions of 1500 rpm for 5 minutes to provide a dispersion, the haze value of the dispersion is 20% or less, wherein the material comprising ultrafine cellulose fibers is in a particulate form and has a cumulative median diameter D50 of 1.2 mm or less.

2. The material comprising ultrafine cellulose fibers according to claim 1, further comprising an organic solvent.

3. The material comprising ultrafine cellulose fibers according to claim 2, wherein the organic solvent is isopropyl alcohol.

4. The material comprising ultrafine cellulose fibers according to claim 1, further comprising a polyvalent metal.

5. The material comprising ultrafine cellulose fibers according to claim 1, further comprising an acid at 0.14% by mass or less with respect to the mass of the ultrafine cellulose fibers.

6. The material comprising ultrafine cellulose fibers according to claim 1, further comprising an alkali at 2% by mass or less with respect to the mass of the ultrafine cellulose fibers.

7. The material comprising ultrafine cellulose fibers according to claim 1, wherein the ultrafine cellulose fibers have an ionic substituent.

8. The material comprising ultrafine cellulose fibers according to claim 1, wherein the ultrafine cellulose fibers have a phosphoric acid group.

9. The material comprising ultrafine cellulose fibers according to claim 8, wherein the amount of the phosphoric acid group in the ultrafine cellulose fibers is 0.5 mmol/g or more.

10. The material comprising ultrafine cellulose fibers according to claim 1, wherein the content of the ultrafine cellulose fibers is 82.1% by mass or more and 95% by mass or less.

11. The material comprising ultrafine cellulose fibers according to claim 1, wherein when a sample of the material comprising ultrafine cellulose fibers is added to water to a solid concentration of 0.4% by mass, and the resulting mixture is stirred with a disperser under conditions of 1500 rpm for 5 minutes to provide a dispersion, the pH of the dispersion is 7 to 11.

* * * * *